(12) United States Patent
Itami

(10) Patent No.: US 7,586,660 B2
(45) Date of Patent: Sep. 8, 2009

(54) DC BRUSHLESS MOTOR, LIGHT DEFLECTOR OPTICAL SCANNING DEVICE, HAVING AN INCREASED EFFICIENCY TO REDUCE POWER CONSUMPTION AND HEAT GENERATION USING EXACTLY SIX POLES AND STATOR WITH NINE TEETH AND CORRESPONDING COILS

(75) Inventor: Yukio Itami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 11/375,286

(22) Filed: Mar. 15, 2006

(65) Prior Publication Data

US 2006/0208179 A1  Sep. 21, 2006

(30) Foreign Application Priority Data

Mar. 18, 2005  (JP) .............................. 2005-078750
Nov. 11, 2005  (JP) .............................. 2005-326952

(51) Int. Cl.
  *G02B 26/08* (2006.01)
(52) U.S. Cl. ................. 359/199.3; 359/200.7; 310/180; 310/67 R
(58) Field of Classification Search ......... 359/197–199; 347/242, 260–261; 250/231, 234–236; 33/1; 310/179, 180, 67 R
  See application file for complete search history.

(56) References Cited

U.S. PATENT DOCUMENTS

| | | | | |
|---|---|---|---|---|
| 4,726,640 A | * | 2/1988 | Iwama et al. ................ | 359/200 |
| 5,006,745 A | * | 4/1991 | Nishio et al. ................ | 310/177 |
| 5,103,335 A | * | 4/1992 | Sugiura ....................... | 359/212 |
| 5,132,833 A | * | 7/1992 | Diau .......................... | 359/221 |
| 5,701,191 A | * | 12/1997 | Iwasaki ....................... | 359/205 |
| 5,708,310 A | * | 1/1998 | Sakamoto et al. ......... | 310/49 R |
| 5,861,696 A | * | 1/1999 | Hartman et al. .......... | 310/156.43 |
| RE36,168 E | * | 3/1999 | von der Heide et al. ... | 310/67 R |
| 6,275,319 B1 | * | 8/2001 | Gadhok ....................... | 359/198 |
| 6,380,646 B1 | * | 4/2002 | Bernauer et al. .......... | 310/49 R |
| 6,522,130 B1 | * | 2/2003 | Lutz .......................... | 324/207.2 |
| 6,700,240 B2 | * | 3/2004 | Akiwa ....................... | 310/67 R |
| 2001/0020805 A1 | * | 9/2001 | Nakano et al. ............. | 310/112 |
| 2006/0208179 A1 | | 9/2006 | Itami | |
| 2007/0253049 A1 | * | 11/2007 | Tomita ....................... | 359/204 |

FOREIGN PATENT DOCUMENTS

| | | |
|---|---|---|
| JP | 2000-50603 | 2/2000 |
| JP | 2001-251831 | 9/2001 |
| JP | 2002-365580 | 12/2002 |
| JP | 2003-177346 | 6/2003 |

OTHER PUBLICATIONS

U.S. Appl. No. 11/851,544, filed Sep. 7, 2007, Itami.

* cited by examiner

*Primary Examiner*—Stephone B Allen
*Assistant Examiner*—Jennifer L. Doak
(74) *Attorney, Agent, or Firm*—Oblon, Spivak, McClelland, Maier & Neustadt, P.C.

(57) ABSTRACT

A light deflector is disclosed that includes a bearing, a motor, a rotary body supported by the bearing and rotated by the motor, and a polygon mirror fixed to the rotary body. The motor includes an annular permanent magnet circumferentially magnetized with six poles and fixed to the rotary body, a rotational position detector part configured to detect the rotational position of the permanent magnet, and a stator assembly including a stator core and nine coils fixed to the stator core.

27 Claims, 27 Drawing Sheets

FIG.5

| | 2 POLES | 4 POLES | 6 POLES | 8 POLES | 10 POLES | 12 POLES | 14 POLES | 16 POLES |
|---|---|---|---|---|---|---|---|---|
| 3 COILS | A | B | | | | | | |
| 6 COILS | C | A | | B | | | | |
| 9 COILS | | C | A | A | | B | | |
| 12 COILS | | | | | | | | |
| 15 COILS | | | | | A | A | | |
| 18 COILS | | | C | | | A | | B |

FIG.9

| | 4-POLE 12-COIL | 4-POLE 6-COIL | 6-POLE 9-COIL | 8-POLE 12-COIL | 8-POLE 6-COIL | 12-POLE 9-COIL |
|---|---|---|---|---|---|---|
| INDUCED VOLTAGE CONSTANT [V·s/rad] | 0.0031 | 0.0031 | 0.0033 | 0.0035 | 0.0030 | 0.0033 |
| COIL RESISTANCE [Ω] | 2.52 | 1.80 | 1.23 | 1.08 | 1.38 | 1.01 |
| COIL INDUCTANCE [mH] | 0.51 | 0.74 | 0.34 | 0.21 | 0.49 | 0.28 |
| NUMBER OF COIL TURNS | 54 | 61 | 38 | 27 | 24 | 31 |
| EXCITATION FREQUENCY (42krpm) [Hz] | 1400 | 1400 | 2100 | 2800 | 2800 | 4200 |

RATIO OF PART C TO CIRCUMSCRIBED
CIRCLE DIAMETER A OF STATOR CORE [%]

RATIO OF PART D TO CIRCUMSCRIBED
CIRCLE DIAMETER A OF STATOR CORE [%]

US 7,586,660 B2

DC BRUSHLESS MOTOR, LIGHT DEFLECTOR OPTICAL SCANNING DEVICE, HAVING AN INCREASED EFFICIENCY TO REDUCE POWER CONSUMPTION AND HEAT GENERATION USING EXACTLY SIX POLES AND STATOR WITH NINE TEETH AND CORRESPONDING COILS

BACKGROUND OF THE INVENTION

1. Field of the Invention

The present invention relates to DC (direct current) brushless motors, light deflectors, optical scanning devices, and image forming apparatuses such as electrophotographic copiers, printers, facsimile machines, and multifunction machines having two or more of these functions.

2. Description of the Related Art

With respect to electrophotographic recorders such as digital copiers and laser printers using a laser writer having a light deflector, light deflectors that rotate at high speeds greater than or equal to 20,000 rpm (revolutions per minute) have been put to practical use with increases in printing speed and pixel density. DC brushless motors such as those described below are used to rotate these light deflectors.

Japanese Laid-Open Patent Application No. 2000-050603 discloses a four-pole, twelve-coil DC brushless motor as an example of the n-pole, 3n-coil type (n=even number).

Japanese Laid-Open Patent Application No. 2001-251831 discloses a DC brushless motor in which magnetic bodies are disposed on the open magnetic path side of rotor magnets. According to this DC brushless motor, magnetic fluxes emanating from the rotor magnets are attracted to the magnetic bodies, so that magnetic fluxes entering other fixed members disposed around the rotor magnets are reduced. As a result, eddy current generation is reduced in the other fixed members. Meanwhile, eddy currents are generated inside the magnetic bodies, but are reduced in magnitude because there is a great distance between the rotor magnets and the magnetic bodies disposed on the open magnetic path side of the rotor magnets. Accordingly, eddy current generation is reduced in the entire DC brushless motor, so that a rise in the temperature of the DC brushless motor due to eddy current loss is reduced.

Japanese Laid-Open Patent Application No. 2003-177346 discloses a polygon scanner that is capable of high-speed rotation with low vibration at high temperatures, thereby achieving power saving and assembly simplification at the same time.

However, in the above-described conventional DC brushless motors, the number of magnetic poles and the number of coils are not optimized for light deflectors, so that a large amount of power is consumed and a large amount of heat is generated.

SUMMARY OF THE INVENTION

According to one embodiment of the present invention, there is provided a DC brushless motor in which the above-described disadvantage is eliminated.

According to one embodiment of the present invention, there are provided a DC brushless motor and a light deflector capable of reducing power consumption and heat generation.

According to one embodiment of the present invention, there is provided a light deflector that reduces the power consumption and heat generation of a DC brushless motor by optimizing the number of magnetic poles and the number of coils for the light deflector, thereby reducing unevenness of rotation.

According to one embodiment of the present invention, there are provided an optical scanning device having high scanning accuracy in which variations in the temperature of optical components such as a lens due to the heat generation of a motor are small, and an image forming apparatus boasting low power consumption and high image quality.

According to one embodiment of the present invention, there is provided a DC brushless motor capable of reducing the windage of a motor part, disposing a bearing in the center hole part of a stator core in spite of reduction in size, and preventing loss due to the winding resistance of a coil from increasing, thereby increasing motor efficiency at high-speed rotation and reducing power consumption.

According to one embodiment of the present invention, there is provided an optical scanning device capable of reducing the power consumption and heat generation of a light deflector so that the shape of a scanning beam is constant and stable.

According to one embodiment of the present invention, there is provided a multi-beam optical scanning device in which the power consumption and heat generation of a light deflector are reduced so that the shape of a scanning beam is constant and stable.

According to one embodiment of the present invention, there is provided a light deflector including a bearing, a motor, a rotary body supported by the bearing and rotated by the motor, and a polygon mirror fixed to the rotary body, wherein the motor includes an annular permanent magnet circumferentially magnetized with six poles and fixed to the rotary body, a rotational position detector part configured to detect a rotational position of the permanent magnet, and a stator assembly including a stator core and nine coils fixed to the stator core.

According to this embodiment of the present invention, there is provided a light deflector that reduces a voltage drop due to coil reactance (inductance), improves motor efficiency at high-speed rotation, and reduces power consumption.

According to one embodiment of the present invention, there is provided a light deflector including a bearing, a motor, a rotary body supported by the bearing and rotated by the motor, and a polygon mirror fixed to the rotary body, wherein the motor includes an annular permanent magnet circumferentially magnetized with n poles and fixed to the rotary body, n being an even number; a rotational position detector part configured to detect a rotational position of the permanent magnet; and a stator assembly including a stator core and multiple coils fixed to the stator core; and the polygon mirror has n surfaces.

According to this embodiment of the present invention, there is provided a light deflector in which the number of magnetic poles of a permanent magnet and the number of surfaces of a polygon mirror coincide with each other so as to match the timing of phase comparison control with the number of mirror surfaces and minimize the variations in scanning speed among the mirror surfaces.

According to one embodiment of the present invention, there is provided an optical scanning device including a semiconductor laser and an optical system including a light deflector according to one embodiment of the present invention, wherein a beam emitted from the semiconductor laser is guided through the optical system onto a scanning surface to be scanned so as to be focused into a light spot thereon, the beam being deflected by the light deflector so as to scan the scanning surface with a scanning line.

According to this embodiment of the present invention, there is provided a stable optical scanning device having a constant scanning beam shape with the reflection surfaces of a light deflector being kept highly accurate.

According to one embodiment of the present invention, there is provided an optical scanning device including a semiconductor laser and an optical system including a light deflector according to one embodiment of the present invention, wherein multiple beams emitted from the semiconductor laser are guided through the optical system onto a scanning surface to be scanned so as to be focused into corresponding light spots thereon, the beams being deflected by the light deflector so as to adjacently scan the scanning surface with multiple scanning lines.

According to this embodiment of the present invention, there is provided a stable multi-beam optical scanning device having a constant scanning beam shape with the reflection surfaces of a light deflector being kept highly accurate.

According to one embodiment of the present invention, there is provided an image forming apparatus including an optical scanning device according to one embodiment of the present invention and a photosensitive medium having a photosensitive surface, wherein a beam emitted from the semiconductor laser is guided through the optical system onto the photosensitive surface so as to be focused into a light spot thereon, the beam being deflected by the light deflector so as to scan the photosensitive surface with a scanning line, thereby forming a latent image on the photosensitive surface; and the latent image is made visible so that an image is obtained.

According to this embodiment of the present invention, there is provided a stable, high-quality image forming apparatus in which the scanning beam of an optical scanning device is constant.

According to one embodiment of the present invention, there is provided an image forming apparatus according to one embodiment of the present invention and a photosensitive medium having a photosensitive surface, wherein multiple beams emitted from the semiconductor laser are guided through the optical system onto the photosensitive surface so as to be focused into corresponding light spots thereon, the beams being deflected by the light deflector so as to adjacently scan the photosensitive surface with multiple scanning lines, thereby forming a latent image on the photosensitive surface; and the latent image is made visible so that an image is obtained.

According to this embodiment of the present invention, there is provided a stable, high-quality image forming apparatus in which the scanning beams of an optical scanning device are constant.

According to one embodiment of the present invention, there is provided a DC brushless motor including an annular permanent magnet circumferentially magnetized with six poles and fixed to a rotary body, a rotational position detector part configured to detect a rotational position of the permanent magnet, and a stator assembly including a stator core having a center hole for fixation formed therein and nine salient poles formed thereon, and multiple coils fixed to the stator core, the stator assembly being disposed inside the annular permanent magnet with a predetermined magnetic gap formed between the stator assembly and the annular permanent magnet, wherein a diameter of the center hole falls within a range of 35±10% of a diameter of a circumscribed circle formed by the nine salient poles.

According to this DC brushless motor, it is possible to reduce power consumption and heat generation.

According to one embodiment of the present invention, there is provided a light deflector including a bearing, a DC brushless motor according to one embodiment of the present invention, a rotary body supported by the bearing and rotated by the DC brushless motor, and a polygon mirror fixed to the rotary body.

According to this light deflector, it is possible to reduce power consumption and heat generation.

According to one embodiment of the present invention, there is provided an optical scanning device including a light source and an optical system including a light deflector, the light deflector including a bearing, a DC brushless motor according to one embodiment of the present invention, a rotary body supported by the bearing and rotated by the DC brushless motor, and a polygon mirror fixed to the rotary body, wherein a light beam emitted from the light source is guided through the optical system onto a scanning surface to be scanned so as to be focused into a light spot thereon, the light beam being deflected by the light deflector so that the light spot scans the scanning surface.

According to this optical scanning device, a change in the temperature of optical components such as a lens due to the heat generation of the motor is reduced. Accordingly, this optical scanning device has high scanning accuracy.

According to one embodiment of the present invention, there is provided an optical scanning device including a light source and an optical system including a light deflector, the light deflector including a bearing, a DC brushless motor according to one embodiment of the present invention; a rotary body supported by the bearing and rotated by the DC brushless motor, and a polygon mirror fixed to the rotary body, wherein multiple light beams emitted from the light source are guided through the optical system onto a scanning surface to be scanned so as to be focused into corresponding light spots thereon, the light beams being deflected by the light deflector so that the light spots scan the scanning surface, the light spots being spaced at predetermined intervals.

According to this optical scanning device, a change in the temperature of optical components such as a lens due to the heat generation of the motor is reduced. Accordingly, this optical scanning device has high scanning accuracy.

According to one embodiment of the present invention, there is provided an image forming apparatus including an optical scanning device including a light source and an optical system including a light deflector, the light deflector including a bearing, the DC brushless motor as set forth in claim 19, a rotary body supported by the bearing and rotated by the DC brushless motor, and a polygon mirror fixed to the rotary body; and a photosensitive medium having a photosensitive surface, wherein a light beam emitted from the light source is guided through the optical system onto the photosensitive surface so as to be focused into a light spot thereon, the light beam being deflected by the light deflector so that the light spot scans the photosensitive surface, thereby forming a latent image on the photosensitive surface, and the latent image is made visible so that an image is obtained.

This image forming apparatus achieves low power consumption and high image quality.

According to one embodiment of the present invention, there is provided an image forming apparatus including an optical scanning device including a light source and an optical system including a light deflector, the light deflector including a bearing, the DC brushless motor as set forth in claim 19, a rotary body supported by the bearing and rotated by the DC brushless motor, and a polygon mirror fixed to the rotary body; and a photosensitive medium having a photosensitive surface, wherein multiple light beams emitted from the light source are guided through the optical system onto the photosensitive surface so as to be focused into corresponding light spots thereon, the light beams being deflected by the light deflector so that the light spots scan the scanning surface, the light spots being spaced at predetermined intervals, thereby forming a latent image on the photosensitive surface, and the latent image is made visible so that an image is obtained.

This image forming apparatus achieves low power consumption and high image quality.

BRIEF DESCRIPTION OF THE DRAWINGS

Other objects, features and advantages of the present invention will become more apparent from the following detailed description when read in conjunction with the accompanying drawings, in which:

FIG. 5 is a table showing combinations of the number of magnetic poles and the number of coils of a motor according to the first embodiment of the present invention;

FIG. 9 is a table showing constants in the voltage equation of the motor according to the first embodiment of the present invention;

DETAILED DESCRIPTION OF THE PREFERRED EMBODIMENTS

A description is given, with reference to the accompanying drawings, of embodiments of the present invention.

First Embodiment

Figure 1:
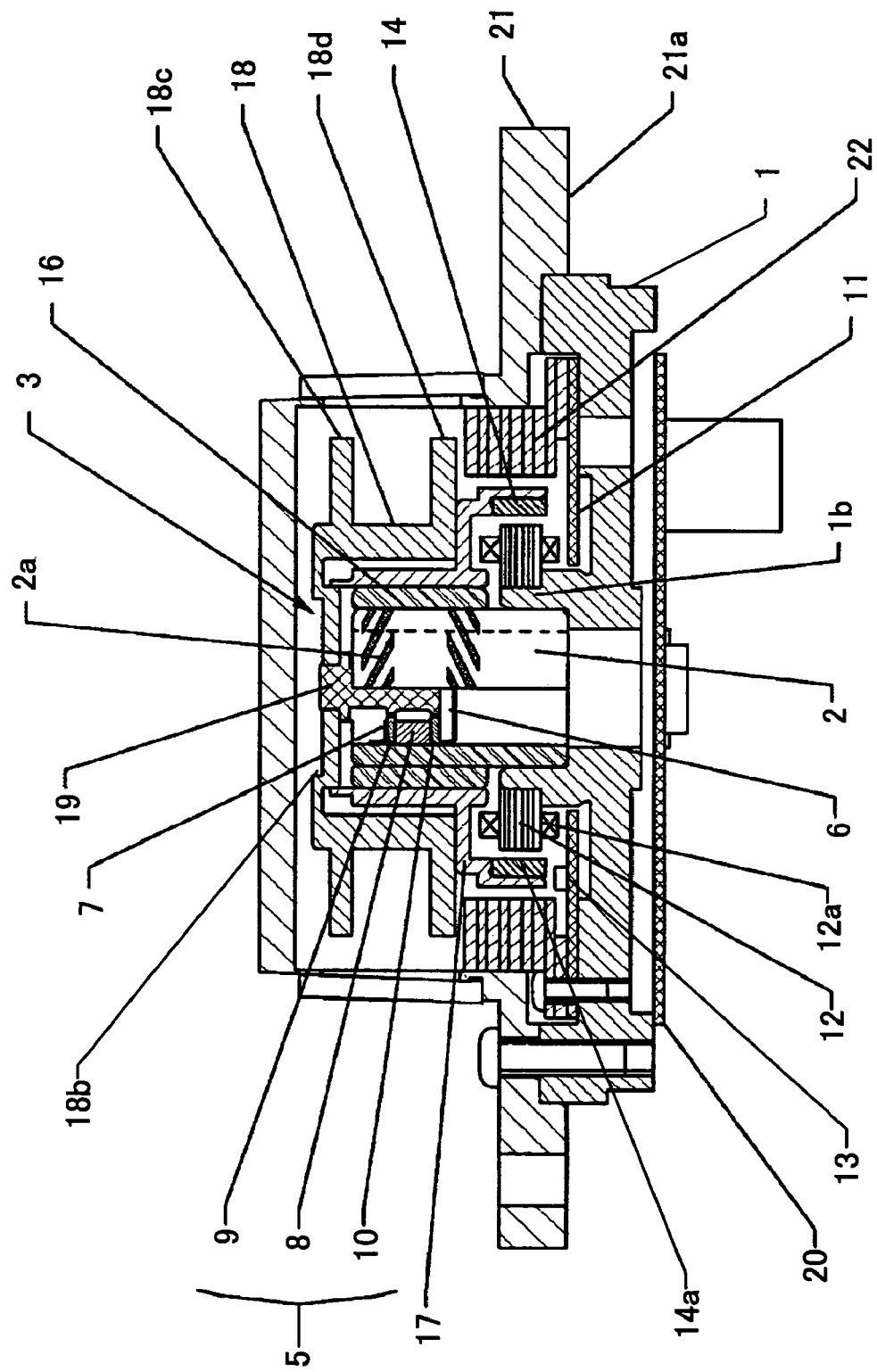
FIG. 1 is a cross-sectional view of a light deflector according to a first embodiment of the present invention.
Figure 2:
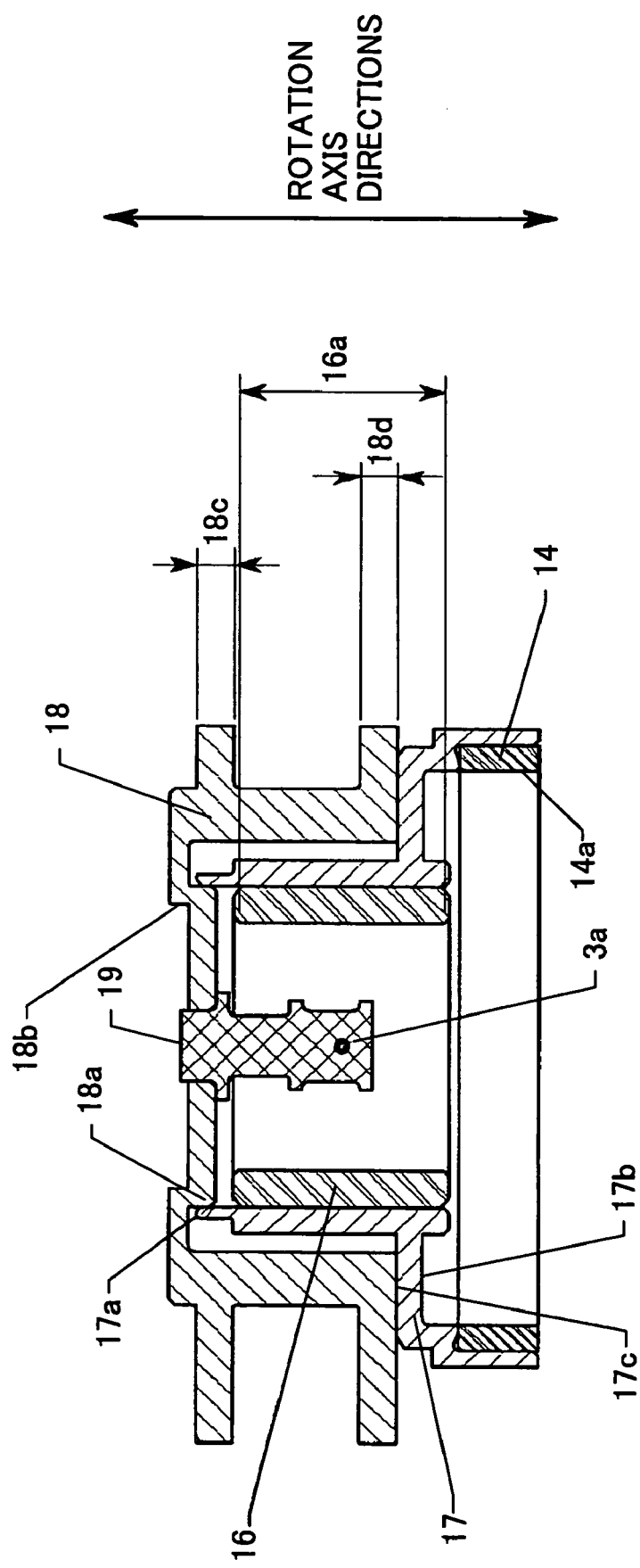
FIG. 2 is a cross-sectional view of a rotary body of the light deflector according to the first embodiment of the present invention.
Figure 3:
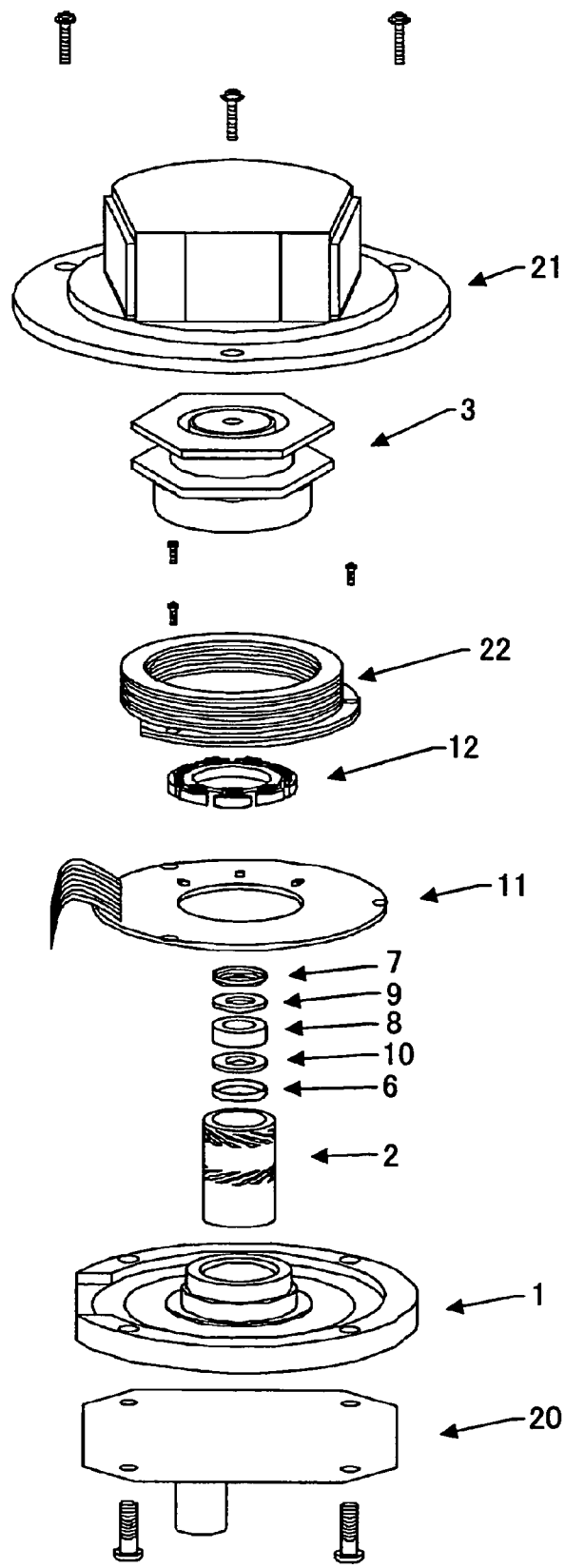
FIG. 3 is an exploded perspective view of the light deflector according to the first embodiment of the present invention.

[Light Deflector]
FIGS. 1 through 3 are diagrams showing a light deflector according to a first embodiment of the present invention. A description is given, with reference to FIGS. 1 through 3, of a configuration and an operation of the light deflector of the first embodiment. In this embodiment, a dynamic pressure air bearing for high-speed rotation is used as a bearing. Alternatively, bearings such as a dynamic pressure fluid bearing and a ball bearing may also be employed.

Referring to FIGS. 1 through 3, a reference surface 21a for attachment to an optics housing is formed on the lower surface of a cover case 21 of the light deflector. A housing 1 is fixed to the cover case 21. A through hole-like bearing attachment part 1b is formed in the center of the upper surface of the housing 1. A fixed shaft 2 forming a dynamic pressure bearing is fitted into and fixed to the bearing attachment part 1b. Multiple oblique grooves 2a for forming the dynamic pressure bearing are formed on the cylindrical surface of the fixed shaft 2. When a rotary body 3 starts rotating, the air pressure of a bearing gap formed between the fixed shaft 2 and a sleeve 16 provided around the upper part of the fixed shaft 2 increases so that the rotary body 3 is supported in a radial direction with respect to the fixed shaft 2 without contact therewith.

A fixation part 5 of an attraction-type magnetic bearing is fixed to the fixed shaft 2 in its internal hollow part. A cap 6 and a stopper 7 are press-fitted and fixed to the internal cylindrical part (hollow part) of the fixed shaft 2 so as to hold and fix the fixation part 5 of the attraction-type magnetic bearing between the cap 6 and the stopper 7 in the axial directions of the fixed shaft 2. At least one fine hole of approximately 0.2-0.5 mm in diameter for attenuating vertical vibration by using viscous resistance at the time of air passage is formed in the center part of the cap 6. A non-magnetic material such as stainless steel is used for both the cap 6 and the stopper 7.

The fixation part 5 of the attraction-type magnetic bearing includes an annular permanent magnet 8 magnetized with two polarities in the directions of a rotation axis, a first fixed yoke plate 9 of a ferromagnetic material with a central circular hole having a diameter smaller than the inside diameter of the annular permanent magnet 8, and a second fixed yoke plate 10 of a ferromagnetic material with a central circular hole having a diameter smaller than the inside diameter of the annular permanent magnet 8. The annular permanent magnet 8 is sandwiched between the first fixed yoke plate 9 and the second fixed yoke plate 10 in the axial directions. The first fixed yoke plate 9 and the second fixed yoke plate 10 are disposed and fixed so that the central circle of the first fixed yoke plate 9 and the central circle of the second fixed yoke plate 10 are concentric with the rotation center axis. A permanent magnet based on a rare earth material is mainly used for the annular permanent magnet 8. A steel-based plate is used as a material for the first and second fixed yoke plates 9 and 10.

A printed board 11 having a hole formed in its center part is disposed on the upper surface of the housing 1. A stator 12 is fitted and fixed to the bearing attachment part 1b of the housing 1 on its outer side. A conductive material such as an aluminum alloy is used for the housing 1. Accordingly, the printed board 11 may be formed of an iron substrate in order to prevent eddy current from flowing through the housing 1 because of an alternating field due to the rotation of a rotor magnet 14 to increase motor loss.

Hall elements 13, which are position detecting elements for switching current to a winding coil (motor winding) 12a, are mounted on the printed board 11. A motor part includes the rotor magnet 14 attached to the rotary body 3, the stator 12 around which the winding coil 12a is wound, the printed board 11 to which the winding coil 12a is connected, the Hall elements 13 mounted on the printed board 11, and a ferromagnetic airflow control yoke 22 disposed outside a flange 17 holding the rotor magnet 14. A lamination of electrical steel sheets such as silicon steel plates is employed for the stator 12 in order to prevent eddy current from flowing therethrough to increase core loss.

Referring to FIG. 2, the rotary body 3 includes the sleeve 16, the flange 17 fixed to the outside of the sleeve 16, a polygon mirror 18 fixed to the flange 17, a rotary part 19 of the magnetic bearing fixed to the polygon mirror 18, and the rotor magnet 14 fixed to the flange 17. The sleeve 16 is formed of ceramic, and the flange 17 is formed of an aluminum alloy. The sleeve 16 and the flange 17 are fixed by shrink fitting.

The rotor magnet 14 for a motor is bonded or press-fitted to the lower cylindrical part of the flange 17. The rotor magnet 14 is shaped like a ring so as to facilitate bonding or press fitting. Alternatively, the rotor magnet 14 may be formed of circumferentially separate permanent magnets. The exterior surface of the rotor magnet 14 is held by the flange 17 so as to prevent the rotor magnet 14 from being broken by centrifugal force due to high-speed rotation. A plastic magnet having substantially the same coefficient of linear expansion as the flange 17 may be used for the rotor magnet 14. The plastic magnet may be fixed by press fitting. This makes it possible to reduce a change in the imbalance vibration of the rotary body 3 due to a change in temperature. Accordingly, this is more suitable for a motor for high-speed rotation.

A press fitting inside diameter part 17a is formed at the upper end of the flange 17. A press fitting outside diameter part 18a of the polygon mirror 18 is press-fitted into and fixed to the press fitting inside diameter part 17a of the flange 17. The flange 17 and the polygon mirror 18 have substantially the same coefficient of linear expansion. A reference surface for mirror finishing (mirror finishing reference surface) 17b perpendicular to a dynamic pressure bearing surface 16a of the sleeve 16 is formed on the flange 17. The mirror finishing reference surface 17b is formed on the other (opposite) side of a mirror contact surface 17c from the polygon mirror 18.

The polygon mirror 18 has two tiers of reflection surfaces 18c and 18d formed integrally in the axial directions. A substantially cup-like hollow is formed inside the polygon mirror 18. The polygon mirror 18 is fixed with the dynamic pressure bearing surface 16a (FIG. 2) formed on the sleeve 16 overlapping part of the reflection surfaces 18c and 18d formed in the polygon mirror 18 at a position in the directions of the rotation axis. The rotary part 19 of the attraction-type magnetic bearing is fixed to the polygon mirror 18 by press fitting. The rotary part 19 of the attraction-type magnetic bearing has an exterior cylindrical surface. The rotary part 19 is disposed so that a magnetic gap is formed between the exterior cylindrical surface and the central circular holes of the first fixed yoke plate 9 and the second fixed yoke plate 10 as shown in FIG. 1 and that the exterior cylindrical surface is concentric with the rotation center axis. A permanent magnet or a steel-based ferromagnetic material is employed for the rotary part 19 of the attraction-type magnetic bearing.

In order to cause the rotary body 3 to rotate at high speed, balance correction is performed at upper and lower correction surfaces 18b and 14a of the rotary body 3. A center of gravity 3a of the rotary body 3 is disposed at or around the center of the dynamic pressure bearing in the axial directions. This makes it possible to correct the balance of the rotary body 3 with high accuracy, so that it is possible to reduce imbalance vibration to an extremely low level.

Wiring patterns connected to the winding coil 12a and the Hall elements 13 are formed on the printed board 11. A driver circuit 20 sequentially switches current to the winding coil 12a in accordance with the position detection signals of the Hall elements 13, thereby controlling the rotary body 3 so that the rotary body 3 rotates at a constant speed.

Figure 4:
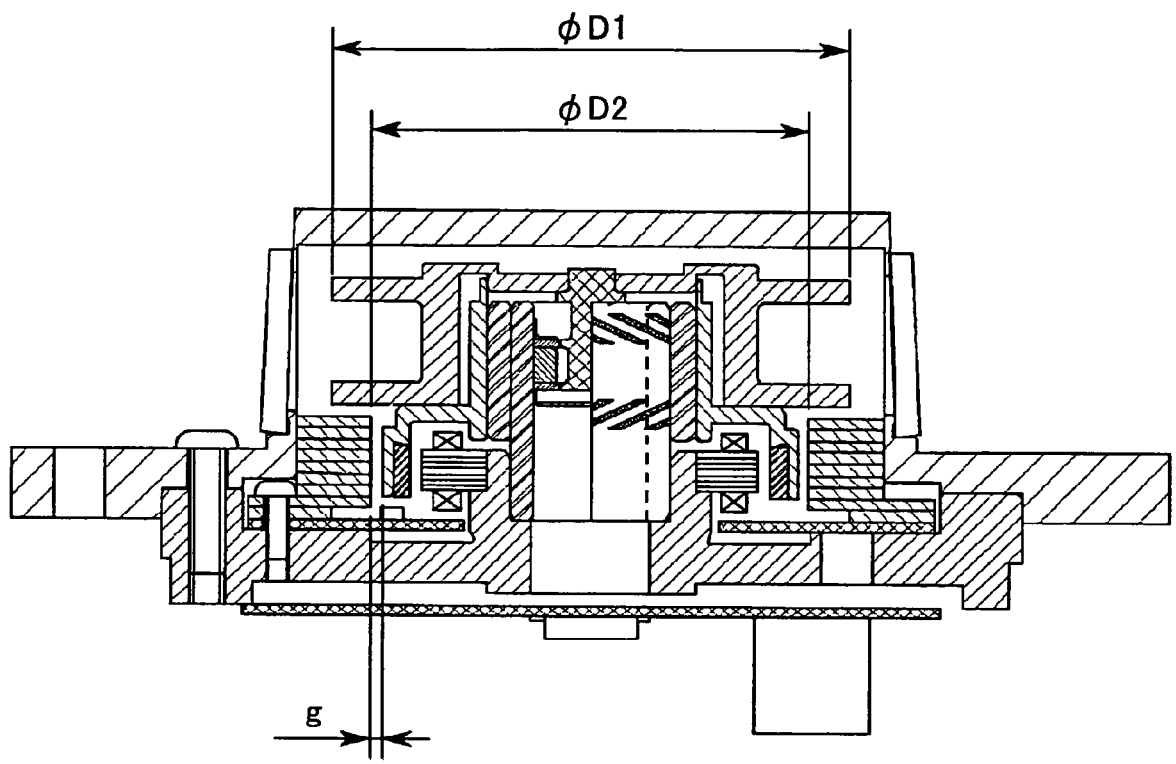
FIG. 4 is a cross-sectional view of the light deflector for illustrating the relationship between the maximum circumscribed circle diameter D1 of the rotary body and the interior cylindrical surface diameter D2 of an airflow control yoke according to the first embodiment of the present invention.

FIG. 4 is a cross-sectional view of the light deflector of this embodiment for illustrating the relationship between the maximum circumscribed circle diameter D1 of the rotary body 3 and the interior cylindrical surface diameter D2 of the airflow control yoke 22. FIG. 4 shows the cross section of the rotary body 3 passing through the apex of the polygon mirror 18 or the maximum circumscribed circle diameter at the time of rotation.

Referring to FIGS. 1 and 4, a certain gap g is formed between the exterior cylindrical surface of the flange 17 and the interior cylindrical surface of the ferromagnetic airflow control yoke 22. The interior cylindrical surface diameter D2 of the airflow control yoke 22 is smaller than the maximum circumscribed circle diameter D1 of the rotary body 3. That is, the relationship between D1 and D2 is as follows:

D1>D2.

By providing this setting of D1>D2, it is possible to dispose the interior cylindrical surface of the airflow control yoke 22 in proximity to the exterior surface of the rotor magnet 14. Thus, it is possible to improve the efficiency of utilization of the magnetic force of the rotor magnet 14, and at the same time, it is possible to reduce turbulence by controlling airflow below the polygon mirror 18.

A decrease in the gap g increases loss due to air friction, thus increasing power consumption. On the other hand, an increase in the gap g reduces the efficiency of utilization of the magnetic force of the rotor magnet 14, thus increasing power consumption. The gap g of 1-3 mm is suitable in terms of low power consumption. At any rpm, power consumption is minimized with the gap g of approximately 2 mm. Thus, the gap g of approximately 2 mm is optimum. The airflow control yoke 22 makes effective use of the magnetic force of the rotor magnet 14, and at the same time, controls airflow around the rotary body 3 so as to prevent turbulence.

The airflow control yoke 22 is formed of a ferromagnetic body. Preferably, the airflow control yoke 22 is a lamination of steel plates of carbon steel, ferrite, etc., and more preferably, is a lamination of electrical steel sheets such as silicon steel plates. Steel plates may be automatically stacked by caulking in a mold.

Employment of a material other than a ferromagnetic body for the airflow control yoke 22 results in insufficient reduction in power consumption. If a material other than a ferromagnetic body, for example, an aluminum alloy, is used for the airflow control yoke 22, not only can a magnetic effect not be produced, but also the alternating field of the rotor magnet 14 increases eddy current flowing through the aluminum-alloy airflow control yoke 22, thus increasing loss to increase power consumption. A ferromagnetic material of high resistivity is suitable for the airflow control yoke 22.

Further, as shown in FIGS. 1 through 3, in the rotary body of a light deflector, the maximum circumscribed circle diameter of a polygon mirror part is often greater than the diameter of a motor part. In the case of processing a mirror surface as a unit with a rotary body in order to form a highly accurate mirror having high angular accuracy with respect to a rotation center axis as in Japanese Laid-Open Patent Application No. 2002-365580, the maximum circumscribed circle diameter of a polygon mirror part is greater than the diameter of a motor part in order to prevent the motor part from being cut together with the polygon mirror part at the time of mirror surface processing. If a yoke is fixed to a cover case as in above-described Japanese Laid-Open Patent Application No. 2001-251831 in this rotary body configuration, the mirror part and the yoke (airflow control yoke) interfere with each other, so that the gap between a rotor magnet and the yoke naturally increases to prevent the efficiency of utilization of the magnetic force of the rotor magnet from being improved. Accordingly, in this embodiment, the airflow control yoke 22 is fixed on the housing 1 side so as to prevent the airflow control yoke 22 and the rotary body 3 from interfering with each other at the time of assembly.

[Optimum Numbers of Motor Poles and Coils for Light Deflector]

A description is given, with reference to FIG. 5, of optimum numbers of motor poles and coils for a light deflector. The number of magnetic poles and the number of coils may be combined in many ways to configure a three-phase motor as the motor part of a light deflector. Therefore, study was conducted of an optimum combination of the number of magnetic poles and the number of coils for increasing speed. For the parameters other than the number of magnetic poles and the number of coils, the same values were employed as much as possible.

First, induced voltages at the time of non-energized rotation were compared using electromagnetic field analysis by FEM (Finite Element Method). As a result, it was confirmed that an induced voltage and a driving torque that can adequately power a motor are obtained by each of the combinations of the number of magnetic poles and the number of coils marked with a letter A, B, or C as shown in the table of FIG. 5. The combinations of the number of magnetic poles and the number of coils shown in FIG. 5 can be categorized into the three groups of A, B, and C.

The Group A motors are of a 2n-pole 3n-coil type, including 2-pole 3-coil, 4-pole 6-coil, 6-pole 9-coil, and 8-pole 12-coil motors (n=an integer greater than or equal to one). With the number of magnetic poles being 2n (n=an integer), the Group A motors are each formed of a total of three sets (phases) of coils with each phase being formed of n coils. The 3n coils are disposed at equal intervals on a circumference, and wound and connected so that the same polarity appears in the n coils of the same phase at the time of energization.

The Group B motors are of a 4n-pole 3n-coil type, including 4-pole 3-coil, 8-pole 6-coil, and 12-pole 9-coil motors (n=an integer greater than or equal to one). With the number of magnetic poles being 4n (n=an integer), the Group B motors are each formed of a total of three sets (phases) of coils with each phase being formed of n coils. The 3n coils are disposed at equal intervals on a circumference, and wound and connected so that the same polarity appears in the n coils of the same phase at the time of energization.

The Group C motors are of a 2n-pole 6n-coil type, including 2-pole 6-coil and 4-pole 12-coil motors (n=an integer greater than or equal to one). For the details of the Group C motors, reference may be made to above-described Japanese Laid-Open Patent Application No. 2000-050603.

Next, it was confirmed from restrictions in motor configuration and the results of test production of components that the combinations crossed out with a diagonal stroke are not suitable for a motor for a light deflector for the following reasons.

(a) Two-pole permanent magnets have only a small magnetic force effective for generating running torque. Accordingly, an induced voltage and driving torque sufficient for high-speed rotation cannot be obtained.

(b) In 3-coil configurations, the coil of one phase concentrates on one point in order to obtain an induced voltage and driving torque sufficient for high-speed rotation. As a result, the bulge of the coil becomes too large.

(c) As the number of magnetic poles increases, a coil excitation switching frequency becomes high, so that the core loss of a stator increases. Therefore, in general, a smaller number of magnetic poles are suitable for a motor for high-speed rotation. With large numbers of poles, such as 14 and 16 poles, the core loss of high-speed rotation increases.

(d) As the number of coils increases, a part of the stator around which a coil is wound becomes thinner. Usually, a stator is formed by stacking silicon steel plates punched out using a press. If the part around which a coil is wound becomes too thin, it becomes difficult to process the stator. In general, the outside diameter of a stator in a motor for a light deflector is relatively small, being less than or equal to 30 mm. Thus, 15 coils and 18 coils are not suitable because the part of the stator around which a coil is wound becomes too thin.

The above-described four points (a) through (d) are problems common to the three motor systems of Groups A, B, and C. The combinations of the cells crossed out with a diagonal stroke in FIG. 5 are not suitable for a motor for a light deflector. Accordingly, the combinations were narrowed down to six systems within the range of 4-12 poles and 6-12 coils, and their maximum rpms in the case of restricting the upper limits of voltage and current to the power supply specifications of a common light deflector (24 V and 1 A) were compared. As a result, their maximum rpms were found to be as follows in descending order.

| | | |
|---|---|---|
| 1. | 6 poles, 9 coils: | 50800 rpm |
| 2. | 8 poles, 12 coils: | 50500 rpm |
| 3. | 4 poles, 12 coils: | 49400 rpm |
| 4. | 4 poles, 6 coils: | 47100 rpm |
| 5. | 12 poles, 9 coils: | 44300 rpm |
| 6. | 8 poles, 6 coils: | 44100 rpm |

Therefore, when comparison is made under the same rpm, power consumption increases in the order described above. That is, the 6-pole 9-coil system can minimize power consumption, and accordingly, is suitable for a motor for high-speed rotation. The influence of a voltage drop due to coil reactance (inductance) is a principal cause for the above-described results.

Figure 6:
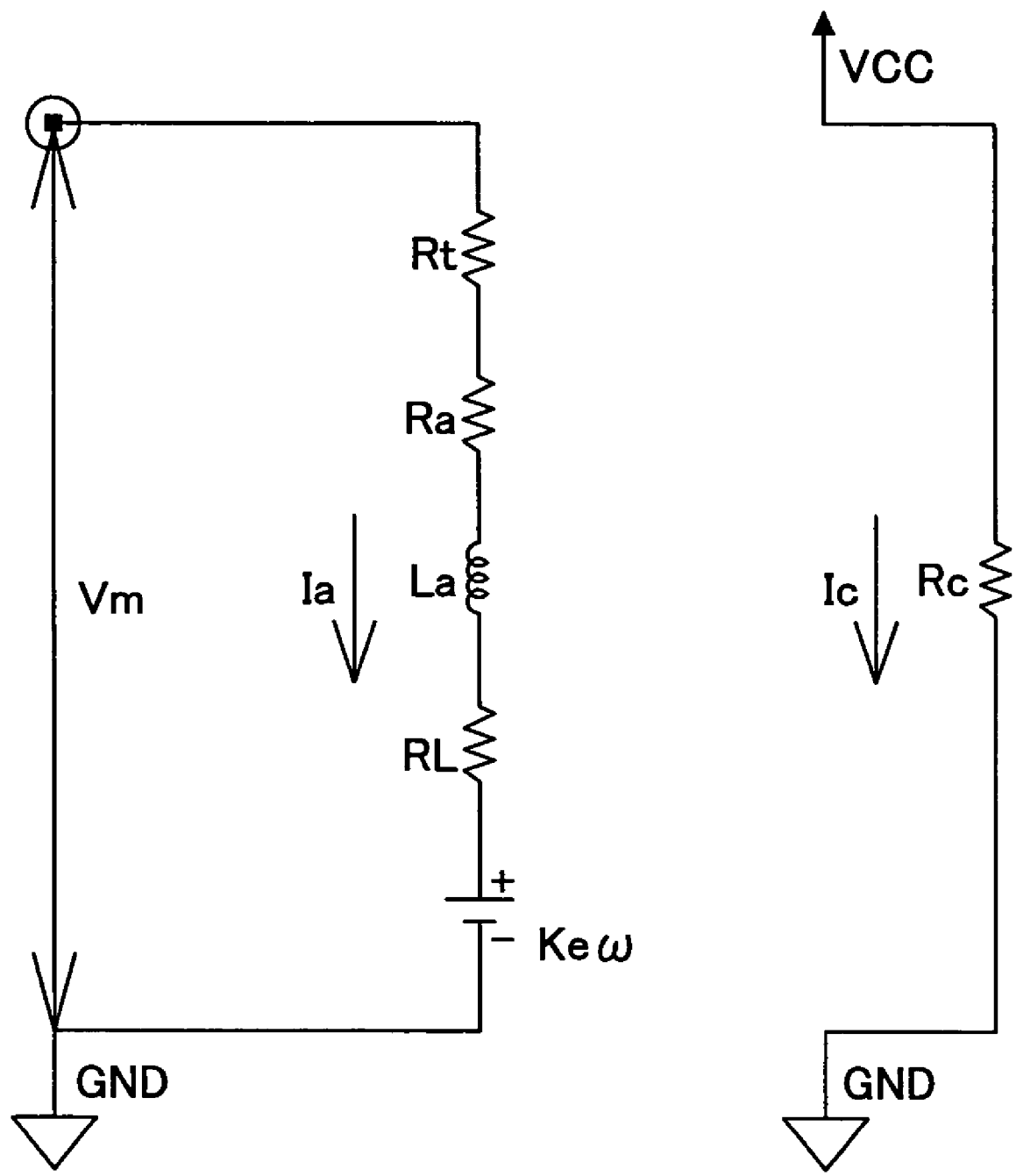
FIG. 6 is a circuit diagram showing an equivalent circuit of the motor according to the first embodiment of the present invention.

The equivalent circuit of the motor is shown in FIG. 6, and the voltage equation of the motor is given as:

$$V_m = K_E \omega + R_a I_a + X_a I_a + R_L I_a + R_t I_a, \quad (1)$$

where $K_E \omega$ is the induced voltage of the motor, $R_a I_a$ is a voltage drop due to coil resistance, $X_a I_a$ is a voltage drop due to coil inductive reactance, $R_L I_a$ is a voltage drop due to the ON resistance of a driver element, $V_m$ is motor voltage, $K_E$ is an induced voltage constant (V·s/rad), $\omega$ is angular velocity (rad/s), $R_a$ is coil resistance (Ω), $I_a$ is coil current (A), $X_a$ is coil inductive reactance (Ω) ($X_a = 2\pi f L_a$, where f is a coil current frequency [Hz] and $L_a$ is coil inductance [H]), $R_L$ is current detection resistance (Ω), and $R_t$ is the ON resistance of the driver element.

Figure 7:
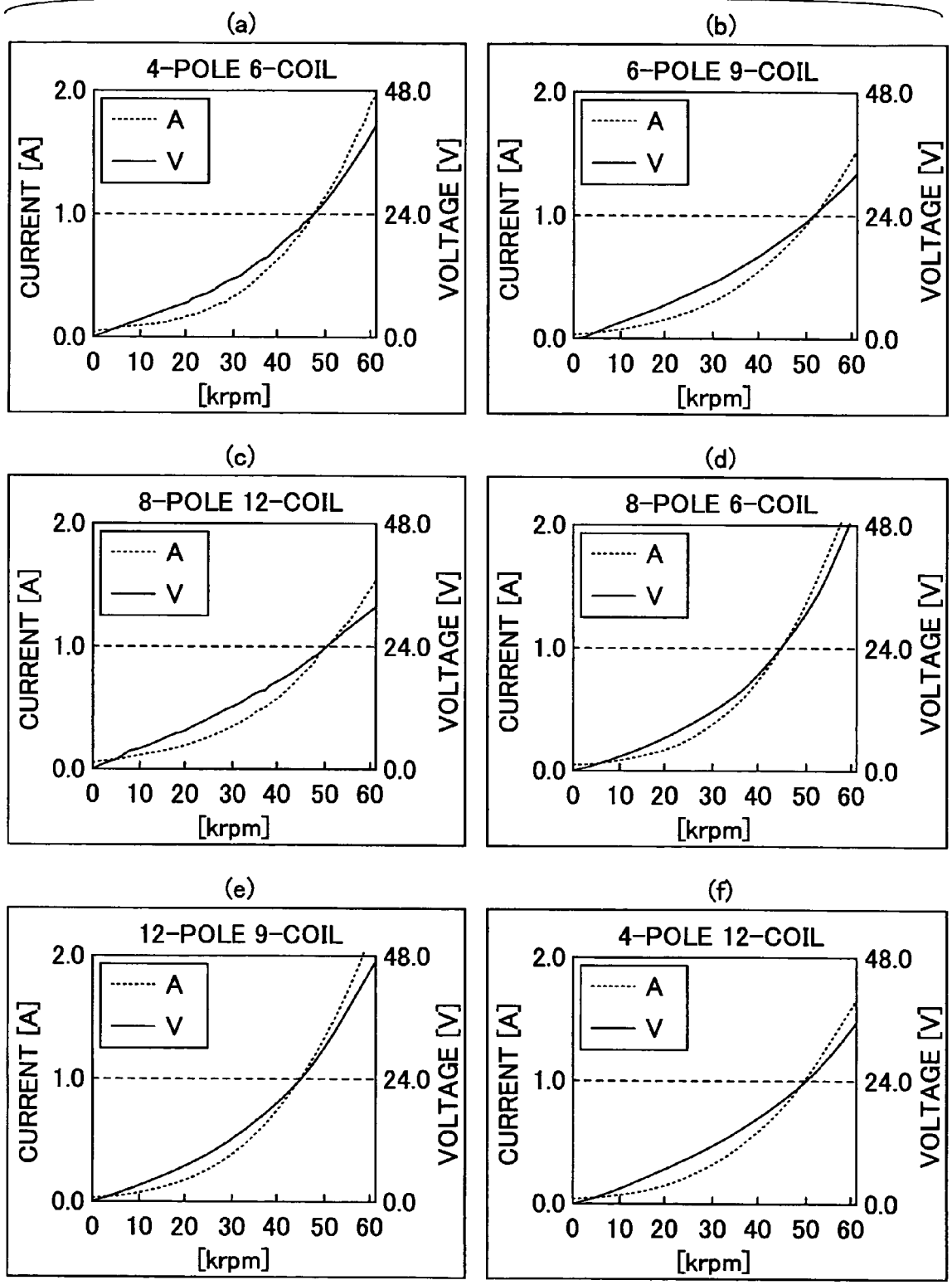
FIG. 7 shows graphs each showing a voltage-current characteristic obtaining the maximum rpm of a corresponding system under 24 V and 1 A according to the first embodiment of the present invention.

The maximum rpms of the above-described six systems are obtained by controlling an induced voltage constant so that a voltage curve and a current curve cross each other at the upper limits of the power supply specifications (24V and 1 A) as shown in FIG. 7. The voltage distributions of the six systems at this point are shown in comparison with one another in FIG. 8. The constants in the voltage equation after the control are shown in FIG. 9.

Figure 8:
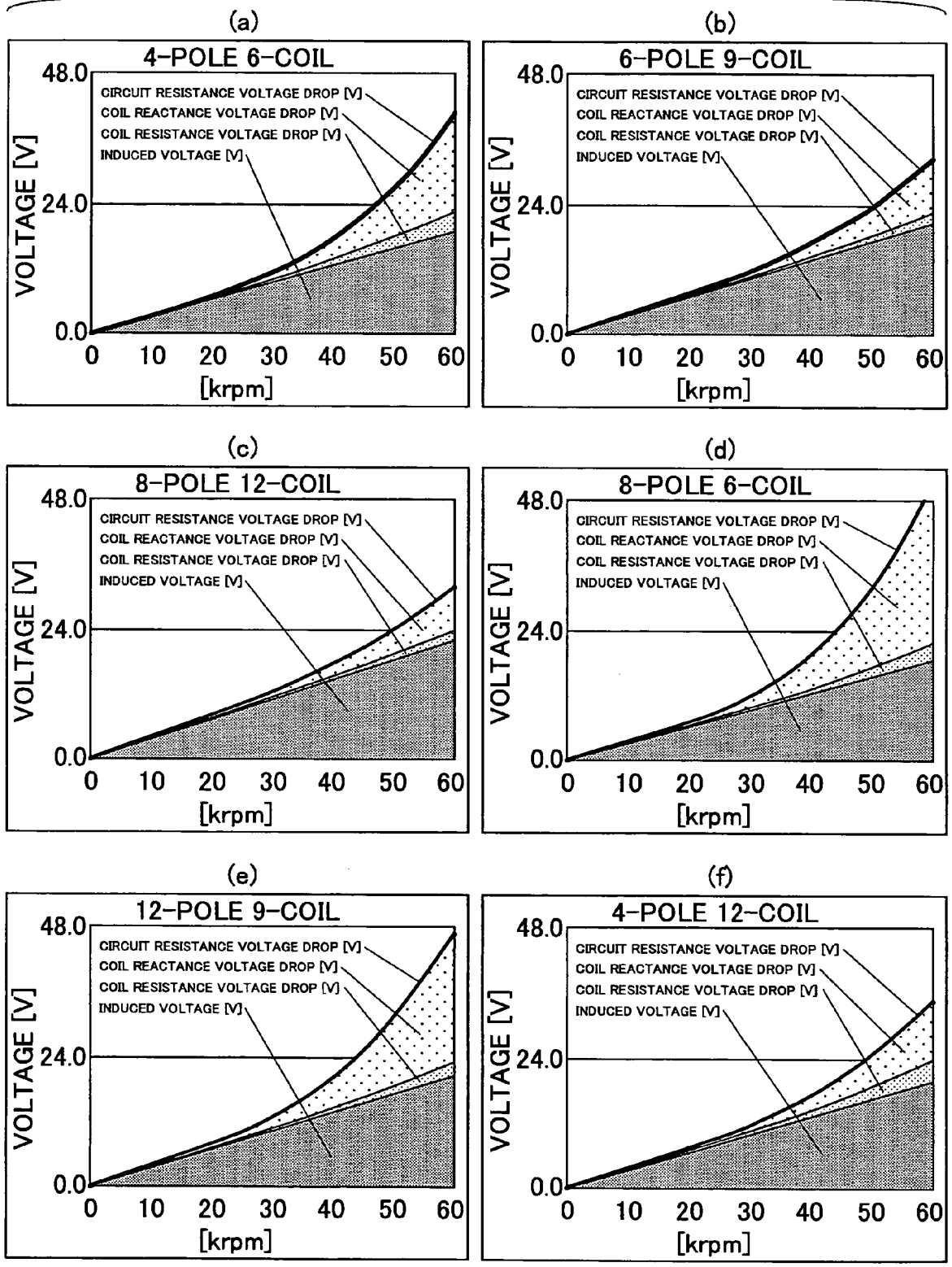
FIG. 8 shows graphs for comparing voltage distributions according to the first embodiment of the present invention.

A description is given below of features of each system in FIG. 8. In each of the graphs (a) through (f) of FIG. 8, the area of the circuit resistance voltage drop is extremely small, and accordingly, is indicated by the uppermost line.

In the 4-pole 6-coil system, the excitation switching frequency is low, but the coil inductance is extremely high. Accordingly, there is a great voltage drop at high rpms. As a result, the proportion of induced voltage is relatively small so as to require a large current to generate necessary driving torque. Accordingly, the voltage and current curves start to rise at relatively low rpms, thus resulting in a low maximum rpm.

In the 8-pole 6-coil system, the coil inductance is high and the excitation switching frequency is also high. Accordingly, there is a great voltage drop due to coil reactance at high rpms. As a result, the proportion of induced voltage is relatively small so as to require a large current to generate necessary driving torque. Accordingly, the voltage and current curves start to rise at relatively low rpms, thus resulting in a low maximum rpm.

In the 12-pole 9-coil system, the coil inductance is low, but the excitation switching frequency is high. Accordingly, there is a great voltage drop due to coil reactance at high rpms. As a result, the proportion of induced voltage is relatively small so as to require a large current to generate necessary driving torque. Accordingly, the voltage and current curves start to rise at relatively low rpms, thus resulting in a low maximum rpm.

In the 6-pole 9-coil system and the 8-pole 12-coil system, the coil inductance is low so that the voltage drop due to coil reactance is small. As a result, the proportion of induced voltage is relatively large so as to result in a small current for generating necessary driving torque. Accordingly, the voltage and current curves rise slowly, so that the maximum rpm is high. Comparing these, the 6-pole 9-coil system has a higher rpm, and can have lower manufacturing costs because coil winding is easy with a small number of total coils.

In the 4-pole 12-coil system, the coil inductance is high, but the excitation switching frequency is low. Accordingly, the voltage drop due to coil reactance is small. However, since the coil resistance is high, the proportion of induced voltage is somewhat small so as to require a somewhat large current to generate necessary torque. Accordingly, the voltage and current curves start to rise at somewhat low rpms, thus resulting in a low maximum rpm.

[Configuration and Operation of Motor Part]

Figure 10:
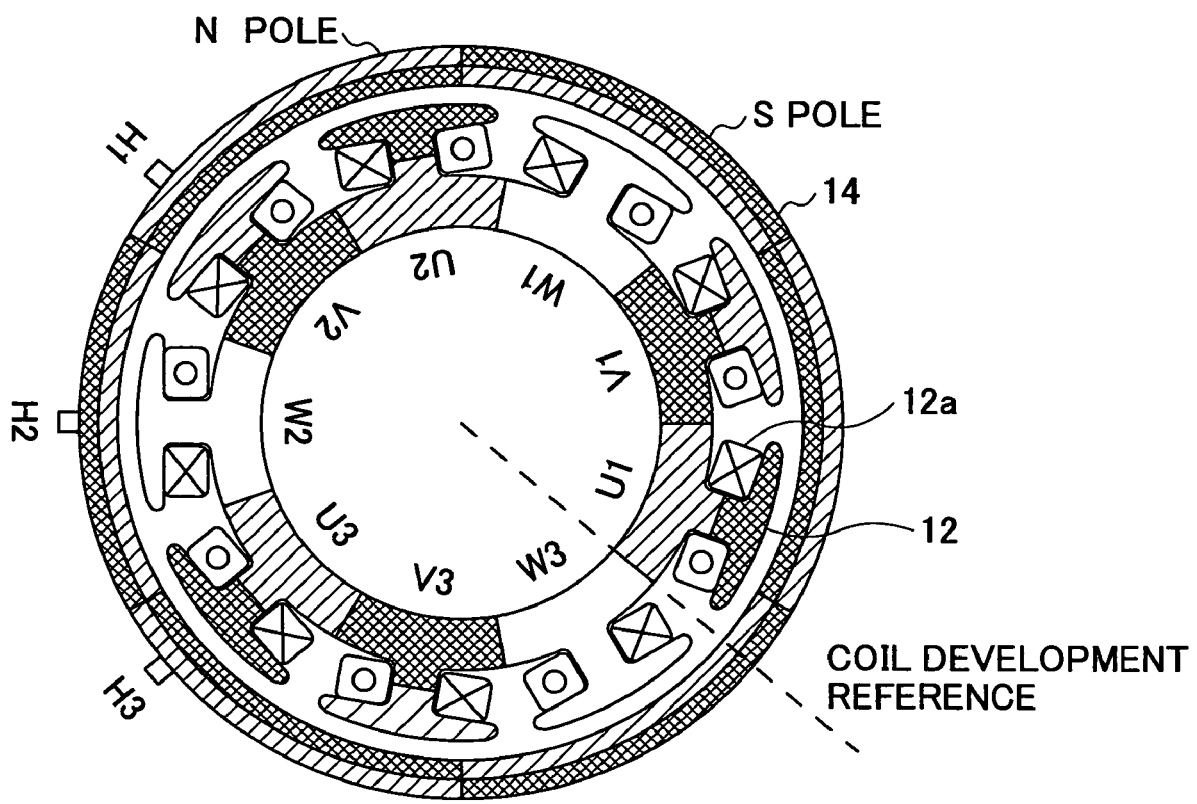
FIG. 10 is a cross-sectional view of a motor part according to the first embodiment of the present invention.

A description is given, with reference to FIG. 10, of a configuration and an operation of the motor part according to the first embodiment of the present invention. As shown in FIG. 10, the rotor magnet 14 is circumferentially magnetized with six poles, and the stator 12 has nine salient poles around which corresponding nine coils 12a (U1 through U3, V1 through V3, and W1 through W3) are wound.

Figure 11:
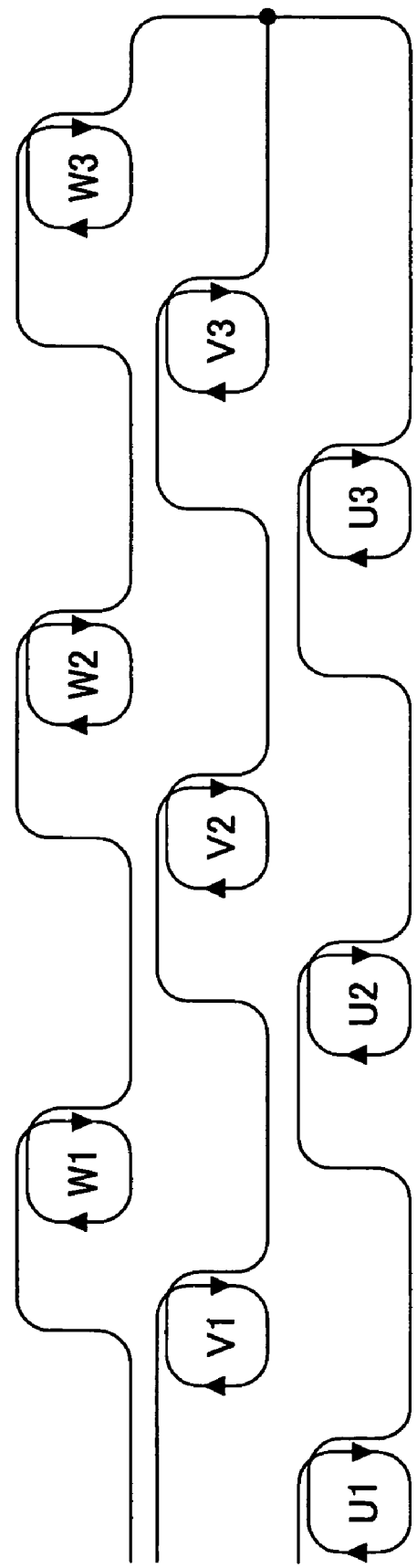
FIG. 11 is a coil development according to the first embodiment of the present invention.
Figure 12:
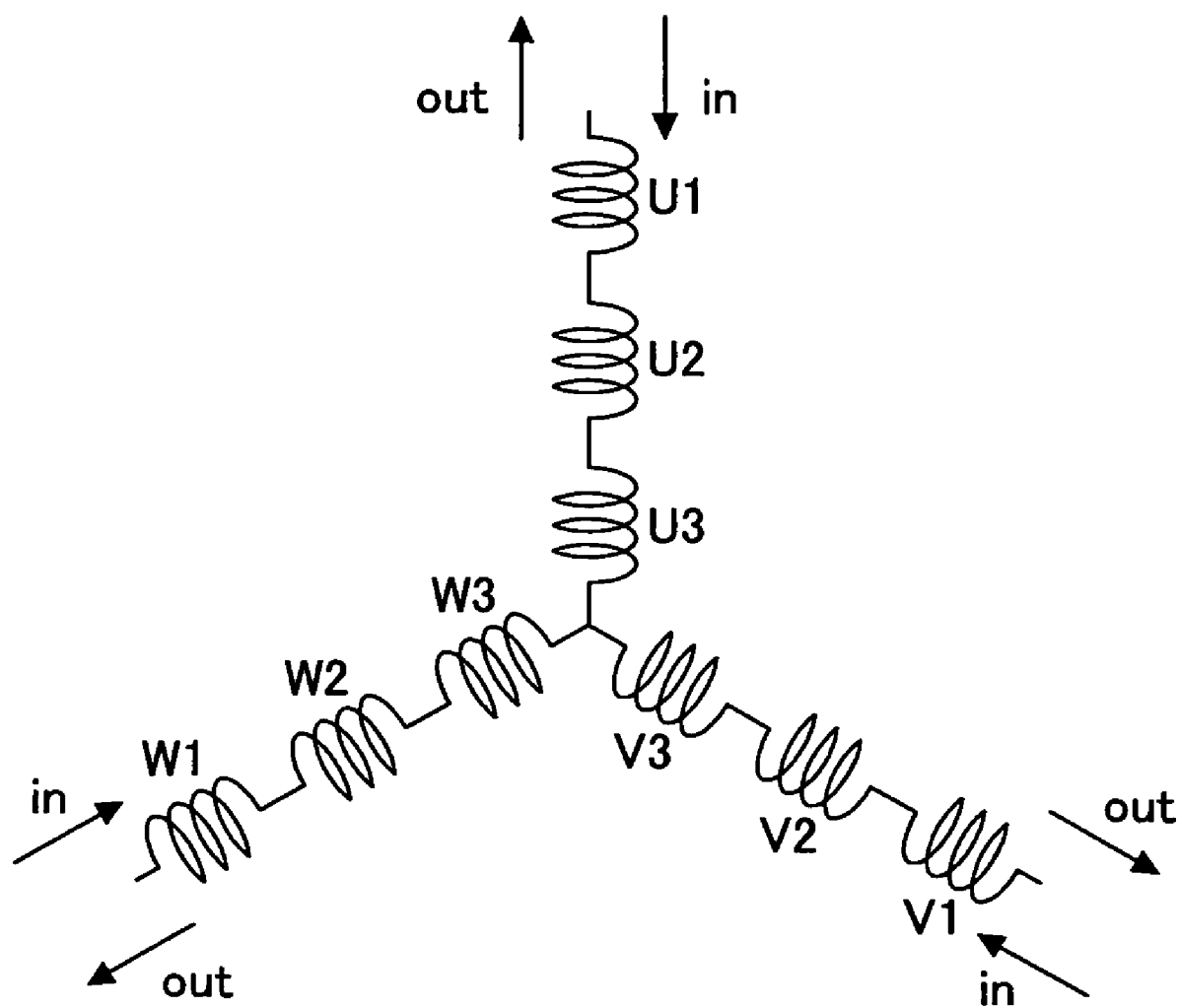
FIG. 12 is a diagram showing a Y-connection of coils according to the first embodiment of the present invention.

FIG. 11 is a diagram for illustrating a coil winding method. FIG. 11 is a development viewed from the permanent magnet side. Referring to FIG. 11, the coils U1, U2, and U3 are wound in the same direction and connected so that the magnetic poles generated on the corresponding surface opposing the permanent magnet (the corresponding exterior surface of the stator core) when energized have the same polarity. The same applies to the coils V1, V2, and V3, and to the coils W1, W2, and W3. The three sets of coils of the three phases U, V, and W are connected to one another by a Y-connection as shown in FIG. 12. The three coils U1 through U3 of the U phase are connected in series. The three coils V1 through V3 of the V phase are connected in series. The three coils W1 through W3 of the W phase are connected in series. One end of each of the coil groups of the three phases U, V, and W is connected to the driver circuit 20 (FIGS. 1 and 3). The phases of the coil groups to be energized are sequentially switched so as to generate a rotating magnetic field, thereby rotating the rotary body 3. Three position detecting elements H1, H2, and H3 are disposed at intervals of 40° so as to detect the rotational position of the rotor magnet 14. Two phases to be energized are selected based on their position detection signals. Magnetoelectric conversion devices such as Hall elements may be employed as the position detecting elements H1, H2, and H3.

FIG. 10 shows the state where the phases of U and V are selected to be energized and excited when the position detecting elements H1, H2, and H3 detect N, S, and N poles, respectively.

Referring further to FIG. 12, a current flows in from U1 and flows out from V1, thereby generating an S pole in the salient poles of U1 through U3 and an N pole in the salient electrode of V1 through V3. As a result, magnetic repulsion or magnetic attraction is exerted between the permanent magnet 14 and the salient poles U1 through U3 and V1 through V3, so that the permanent magnet 14 can be rotated counterclockwise. The rotor magnet 14 is circumferentially magnetized with six poles with reversal of poles between the interior side and the exterior side. The position detecting elements H1, H2, and H3 may be disposed on the interior side, but magnetic noise is on their position detection signals detecting the position of the rotor magnet 14 because of the effect of stator excitation switching. Accordingly, it is better to dispose the position detecting elements H1, H2, and H3 on the exterior side of the rotor magnet 14.

Figure 13:
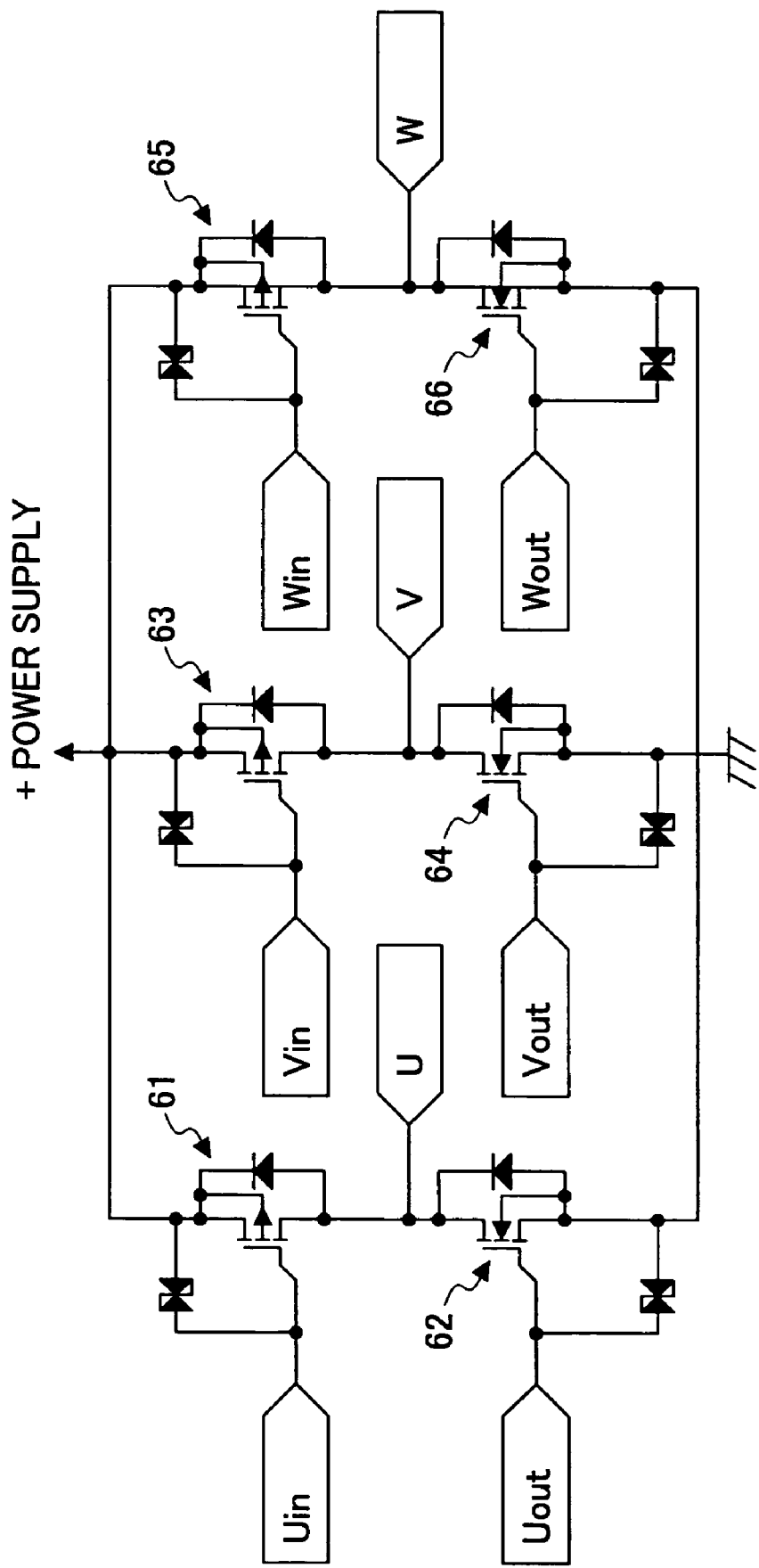
FIG. 13 is a circuit diagram showing switching devices for energization switching of a driver circuit according to the first embodiment of the present invention.

FIG. 13 is a circuit diagram showing switching devices for energization switching of the driver circuit 20 realizing such a two-phase excitation driving system. As shown in FIG. 13, transistors or field-effect transistors are used for switching devices for energization switching 61 through 65. In this case, six transistors or field-effect transistors are necessary.

Figure 14:
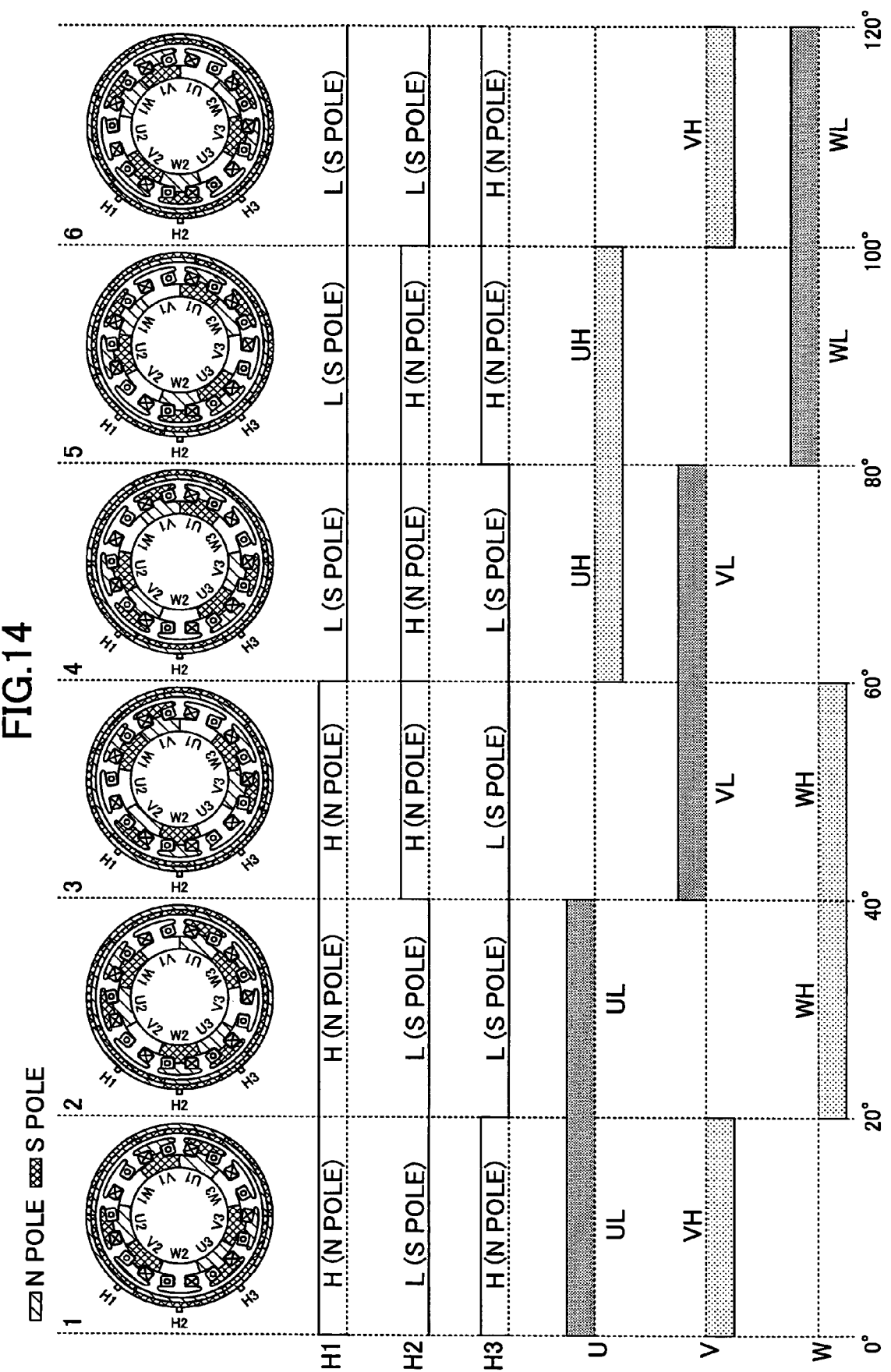
FIG. 14 is a diagram showing generation of a rotating magnetic field and rotation of a permanent magnet by position detection and energization switching according to the first embodiment of the present invention.

FIG. 14 is a diagram for illustrating generation of a rotating magnetic field by position detection and energization switching, and the rotation of the rotor magnet 14 and the rotary body 3 caused thereby according to 6-pole 9-slot 2-phase excitation driving of this embodiment (6-pole 9-slot [9-coil] 3-phase system). FIG. 14 shows the state where the phases to be energized are switched every 20° so that a rotating magnetic field is generated to cause the rotary body 3 including the rotor magnet 14 to rotate counterclockwise. While the rotor magnet 14 rotates 120°, energization is switched six times. During a single rotation, energization is switched 18 times.

Figure 15:
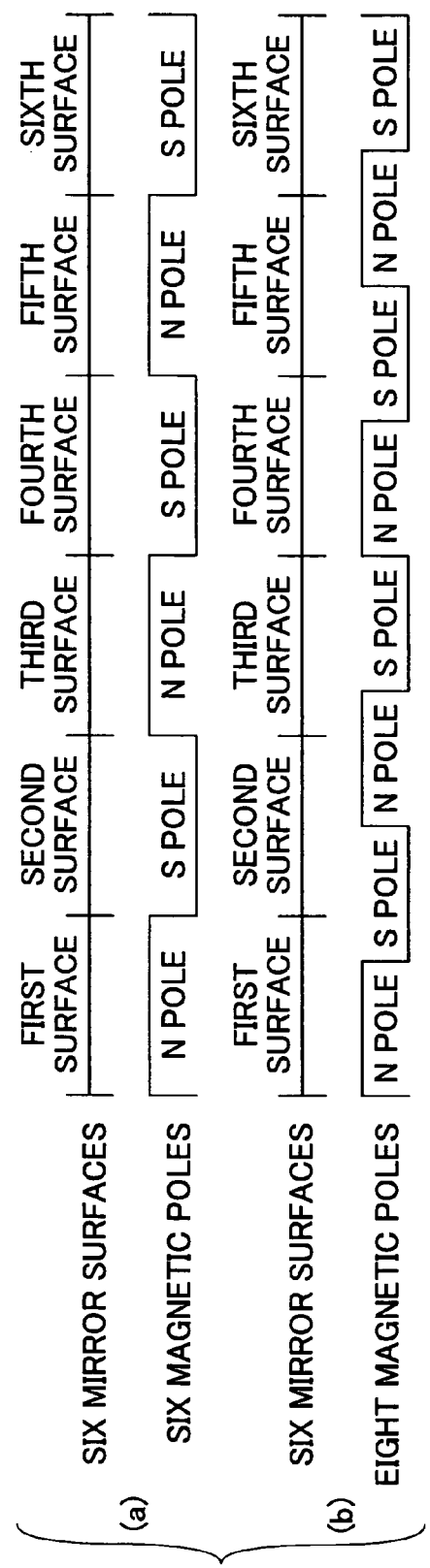
FIG. 15 is a diagram showing a case where the number of mirror surfaces and the number of magnetic poles coincide with each other at six and a case where the number of mirror surfaces and the number of magnetic poles are different from each other according to the first embodiment of the present invention.

According to the first embodiment, six surfaces are formed on the polygon mirror 18, so that the number of mirror surfaces and the number of magnetic poles of the rotor magnet 14 match each other at six. The light deflector performs phase comparison control in order to control scanning speed with high accuracy, and uses the position detection signals of the rotor magnet 14 detected in the position detecting elements H1, H2, and H3 for speed control. Speed control is performed so that the phase deviations of the position detection signals are constant with respect to a target reference signal provided by a main body apparatus. Accordingly, it is possible to match the timing of speed control with the number of mirror surfaces by matching the number of magnetic poles and the number of mirror surfaces with each other at six as shown in (a) of FIG. 15. As a result, compared with the case where the number of magnetic poles and the number of mirror surfaces do not match each other as in (b) of FIG. 15, it is possible to minimize the variations in scanning speed among the mirror surfaces. This effect can be produced by matching the number of magnetic poles and the number of mirror surfaces with each other. The numbers are not limited to six. A combination of four magnetic poles and four mirror surfaces and a combination of eight magnetic poles and eight mirror surfaces may also be employed.

The rotor magnet 14 is fixed to the rotary body 3 so that the magnetization boundaries of the rotor magnet 14 and the apex positions of the polygon mirror 18 substantially match each other in the rotational direction of the rotary body 3. As a result, the apex positions of the polygon mirror 18 can be detected from the position detection signals of the rotor magnet 14 detected in the position detecting elements H1, H2, and H3. By matching the number of magnetic poles and the number of mirror surfaces with each other, it is possible to make constant the relationship between the phase of the target reference signal and the position of the polygon mirror 18. As a result, in a color image forming apparatus using multiple (for example, four) light deflectors, it is possible to match the rotational phases of the light deflectors and minimize color misregistration due to the misregistration of the writing positions of corresponding colors.

According to the first embodiment, the following effects are produced. That is, since the motor part includes the rotor magnet 14 circumferentially magnetized with six poles and fixed to the rotary body 3, a rotational position detector part to detect the rotational position of the rotor magnet 14, and the stator 12 having the nine coils 12a fixed to the stator core, it is possible to provide a light deflector that reduces a voltage drop due to coil reactance (inductance), improves motor efficiency at high-speed rotation, and reduces power consumption.

Since the rotor magnet 14 is held by its exterior side with a magnetic gap being disposed on its interior side, the rotor magnet 14, whose mechanical strength is low, is prevented from being damaged by centrifugal force due to high-speed rotation.

The exterior surface of the rotor magnet 14 is held by a non-magnetic material so that magnetism can penetrate through to the exterior side of the permanent magnet (rotor magnet 14).

Disposition of the airflow control yoke 22 formed of a ferromagnetic body outside the rotor magnet 14 makes it possible to improve the efficiency of utilization of the magnetic force of the rotor magnet 14, reduce the power consumption and heat generation of the motor by controlling airflow around the rotary body 3 to reduce turbulence, and reduce unevenness of rotation.

Disposition of a rotational position detector part on the exterior side of the rotor magnet 14 prevents the position detecting elements H1, H2, and H3 from being affected by magnetism due to coil energization to wrongly detect the positions of the magnetic poles of the permanent magnet.

The number of mirror surfaces of the polygon mirror 18 is set to six so as to coincide with the number of magnetic poles of the rotor magnet 14. As a result, it is possible to match the timing of phase comparison control with the number of mirror surfaces and minimize the variations in scanning speed among the mirror surfaces.

The rotor magnet 14 is fixed to the rotary body 3 so that the magnetization boundaries of the rotor magnet 14 and the apex positions of the polygon mirror 18 substantially coincide with each other in the rotational direction of the rotary body 3. As a result, it is possible to detect the apex positions of the polygon mirror 18 with the position detecting elements H1, H2, and H3.

The outside diameter of the rotor magnet 14 is smaller than the inscribed circle diameter of the polygon mirror 18. This makes it possible to reduce the windage of the motor part, and to facilitate processing of the polygon mirror 18 as a unit with the motor part so as to increase the accuracy of the mirror surfaces.

The polygon mirror 18 may have multiple tiers of reflection surfaces in the axial directions. As a result, it is possible to use the light deflector of this embodiment in the optical scanning device of a color image forming apparatus.

The motor part includes the rotor magnet 14 circumferentially magnetized with n poles (n=an even number) and fixed to the rotary body 3, a rotational position detector part to detect the rotational position of the rotor magnet 14, and the stator 12 having the multiple coils 12a fixed to the stator core. The polygon mirror 18 has n mirror surfaces so that the number of magnetic poles and the number of mirror surfaces coincide with each other. As a result, it is possible to match the timing of phase comparison control with the number of mirror surfaces and minimize the variations in scanning speed among the mirror surfaces.

Second Embodiment

[Optical Scanning Device]

Figure 16:
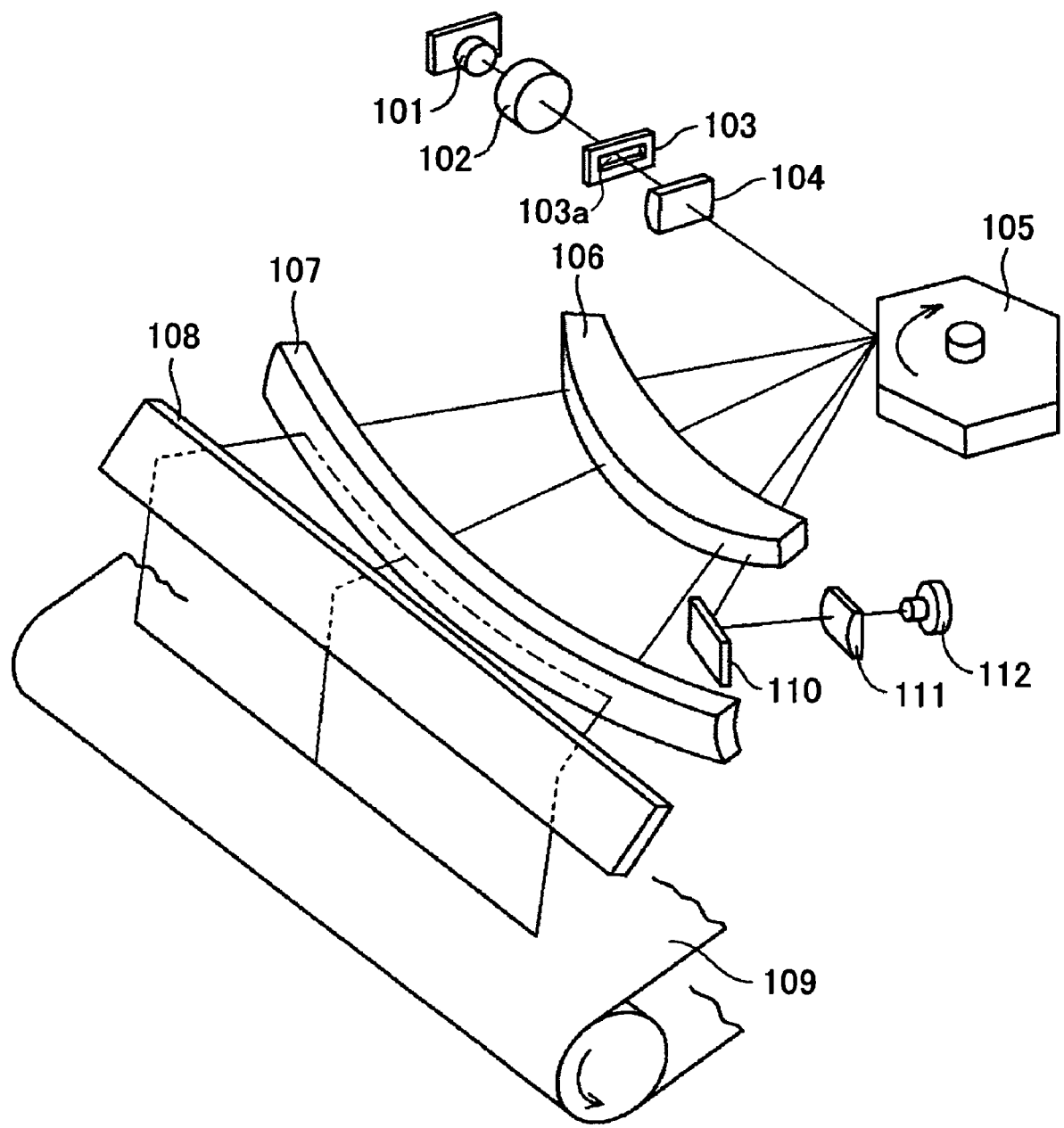
FIG. 16 is a schematic diagram showing an optical scanning device according to a second embodiment of the present invention.

FIG. 16 is a schematic diagram showing part of an optical scanning device according to a second embodiment of the present invention. The optical scanning device of this embodiment includes a light deflector according to one embodiment of the present invention. This optical scanning device is of a single beam type.

The optical scanning device according to this embodiment includes a light source 101, a coupling lens 102, an aperture 103, a cylindrical lens 104, a polygon mirror 105, lenses 106 and 107, a mirror 108, a photosensitive body 109, a mirror 110, a lens 111, and a light receiving element 112.

The light source 101 is a semiconductor laser device to emit light for optical scanning. The coupling lens 102 adapts the light emitted from the light source 101 to an optical system. The aperture 103 forms the light beam for optical scanning into a predetermined shape. The cylindrical lens 104 gathers the incident light beam in the sub scanning direction. The polygon mirror 105 is a light deflector according to one embodiment of the present invention. The polygon mirror 105 reflects the incident light on its deflection reflection surface. The lenses 106 and 107 focus the light beam on the photosensitive body 109. The mirror 108 bends the optical path of the light beam so as to guide the light beam to the photosensitive body 109. An electrostatic latent image is formed on the photosensitive body 109 in accordance with the light beam with which the photosensitive body 109 is illuminated. The mirror 110 and the lens 111 concentrate the light beam onto the light-receiving element 112. The light-receiving element 112 is a photodetector device such as a photodiode.

The beam emitted from the light source 101, which is a semiconductor laser device, is a divergent pencil of rays, and is coupled to the subsequent optical system by the coupling lens 102. The form of the coupled beam corresponds to the optical characteristics of the subsequent optical system. The beam may be a slightly divergent pencil of rays, a slightly convergent pencil of rays, or a parallel pencil of rays. When the beam passing through the coupling lens 102 passes through an opening 103a of the aperture 103, the beam is subjected to "beam shaping" with the opening 103a blocking the peripheral part of the beam where light intensity is low. Thereafter, the beam enters the cylindrical lens 1104, which is a "linear imaging optical system." The cylindrical lens 104 has a substantially half tube shape. The cylindrical lens 104 has a powerless direction (a direction in which light is not refracted) in the main scanning direction, and has positive power (power to converge light) in the sub scanning direction. The cylindrical lens 104 converges the incident beam in the sub scanning direction, and concentrates the beam on and around the deflection reflection surface of the polygon mirror 105 serving as a "light deflector."

While being deflected in a constant angular velocity manner with the rotation of the polygon mirror 105 at a constant velocity, the beam reflected from the deflection reflection surface of the polygon mirror 105 passes through the two lenses 106 and 107 forming a "scanning optical system," and has its optical path bent by the bending mirror 108 so as to be focused into a light spot on the photoconductive photosensitive body 109 forming the substance of a "surface to be scanned" (scanning surface) and scan the scanning surface. The beam is incident on the mirror 110 before scanning the scanning surface, and is gathered onto the light-receiving element 112 by the lens 111. The timing of writing onto the photosensitive body 109 is determined by a control part (not graphically illustrated) based on the output of the light-receiving element 112.

Thus, a light deflector according to one embodiment of the present invention is applicable to an optical scanning device of a single beam type. According to an optical scanning device of a single beam type to which a light deflector according to one embodiment of the present invention is applied, the power consumption and heat generation of the polygon mirror 105 serving as a light deflector are reduced, so that a change in the temperature of optical components such as a lens due to the heat generation of the light deflector is reduced. As a result, a scanning beam is constant in shape, thus making it possible to perform optical scanning with stability.

Third Embodiment

[Multi-beam Optical Scanning Device]

Figure 17:
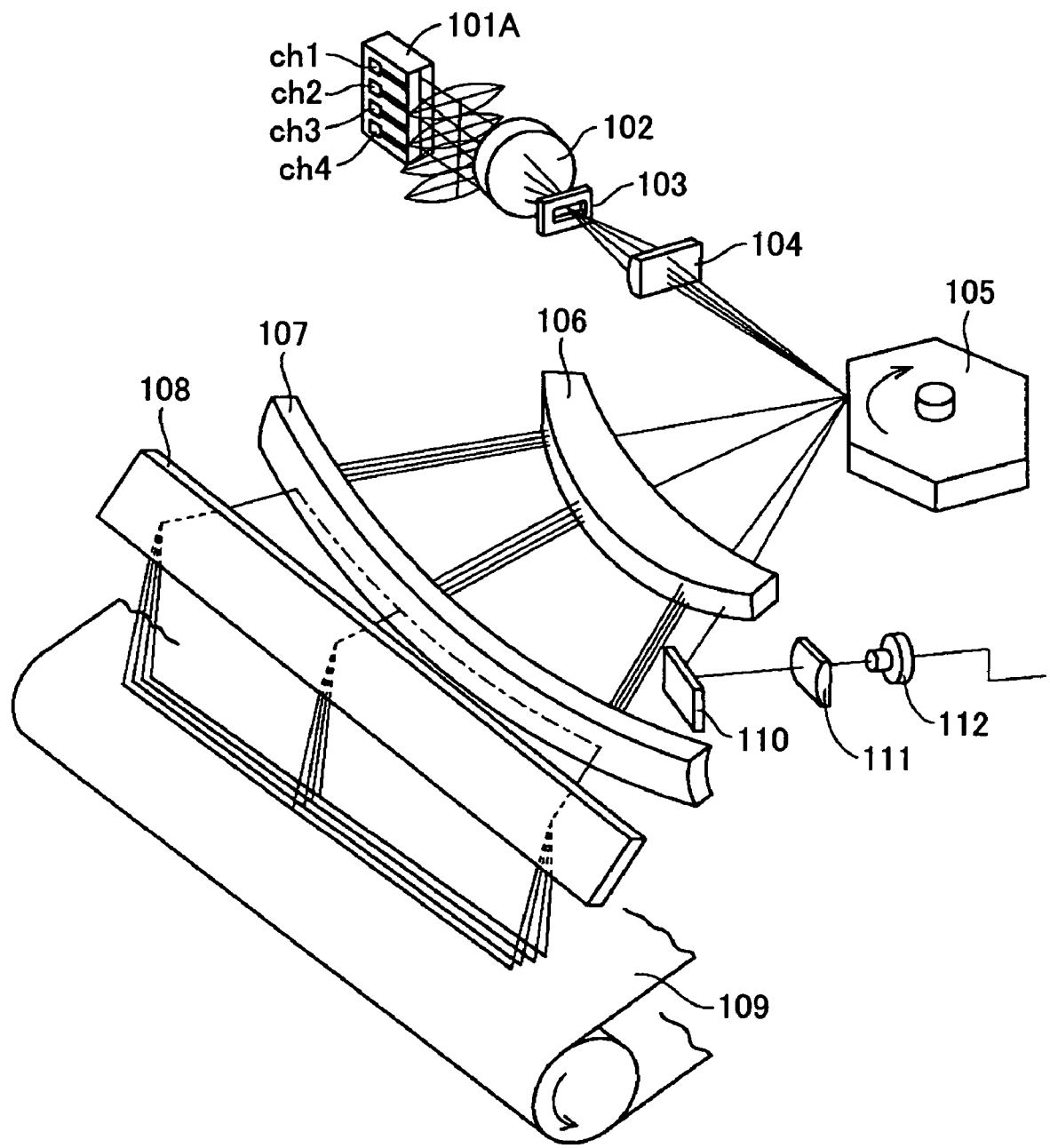
FIG. 17 is a schematic diagram showing a multi-beam optical scanning device according to a third embodiment of the present invention.

FIG. 17 is a schematic diagram showing part of an optical scanning device according to a third embodiment of the present invention. The optical scanning device of this embodiment includes a light deflector according to one embodiment of the present invention. This optical scanning device is of a multi-beam type. In FIG. 17, the same elements as those of FIG. 16 are referred to by the same numerals.

A light source 101A is a semiconductor laser array in which four light emission sources ch1 through ch4 are arranged at equal intervals in an array. In this embodiment, the light emission sources ch1 through ch4 are arranged in the sub scanning direction. Alternatively, the semiconductor laser array 101A may be inclined so that the direction of the light emission source array is inclined to the main scanning direction.

Referring to FIG. 17, each of four beams emitted from the four light emission sources ch1 through ch4, which is a divergent pencil of rays of which the long axis direction of the elliptic far field pattern is directed in the main scanning direction as graphically illustrated, is coupled to the subsequent optical system by the coupling lens 102 common to the four beams. The form of each coupled beam corresponds to the optical characteristics of the subsequent optical system. The beam may be a slightly divergent pencil of rays, a slightly convergent pencil of rays, or a parallel pencil of rays.

Each of the four beams passing through the coupling lens 102 is subjected to "beam shaping" by the aperture 103, and is converged in the sub scanning direction by the action of the cylindrical lens 104 serving as a "common linear imaging optical system." The four beams converged in the sub scanning direction form respective linear images having length in the main scanning direction, separated from one another in the sub scanning direction, on and around the deflection reflection surface of the polygon mirror 105 serving as a "light deflector."

The four beams deflected in a constant angular velocity manner by the deflection reflection surface of the polygon mirror 105 pass through the two lenses 106 and 107 forming a "scanning optical system," and have their respective optical paths bent by the bending mirror 108. The four beams having their respective optical paths bent are focused into four light spots separated in the sub scanning direction on the photosensitive body 109 forming the substance of the "scanning surface," and simultaneously scan the scanning surface with four scanning lines.

One of the four beams is incident on the mirror 110 and is gathered onto the light-receiving element 112 by the lens 111 before scanning the scanning surface. The timing of writing onto the photosensitive body 109 by the four beams is determined by a control part (not graphically illustrated) based on the output of the light-receiving element 112.

The "scanning optical system" according to this embodiment is an optical system that focuses four beams simultaneously deflected by a light deflector (the polygon mirror 105) into four light spots on the scanning surface of the photosensitive body 109, and is configured by the two lenses 106 and 107.

Thus, a light deflector according to one embodiment of the present invention is applicable to an optical scanning device of a multi-beam type. According to an optical scanning device of a multi-beam type to which a light deflector according to one embodiment of the present invention is applied, the power consumption and heat generation of the polygon mirror 105 serving as a light deflector are reduced, so that a change in the temperature of optical components such as a lens due to the heat generation of the light deflector is reduced. As a result, a scanning beam is constant in shape, thus making it possible to perform optical scanning with stability. Further, a stable multi-beam optical scanning device is provided that has a constant scanning beam shape with the reflection surfaces of the light deflector being kept highly accurate. Further, a stable, high-quality image forming apparatus is provided in which the scanning beam of an optical scanning device is constant.

Fourth Embodiment

[Image Forming Apparatus]

Figure 18:
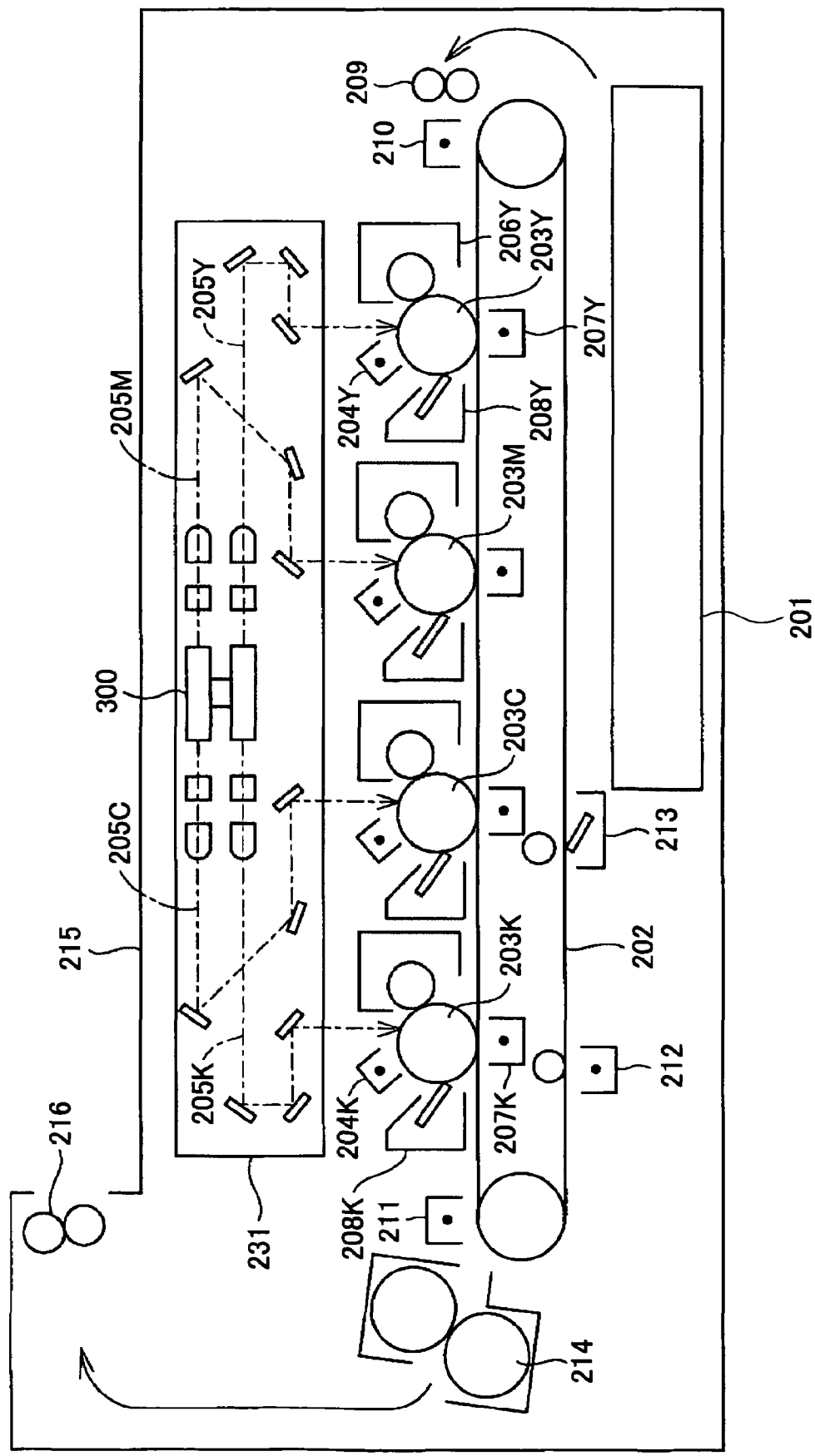
FIG. 18 is a schematic diagram showing a tandem full-color laser printer according to a fourth embodiment of the present invention.

FIG. 18 is a schematic diagram showing a tandem full-color laser printer according to a fourth embodiment of the present invention. The laser printer of this embodiment includes a light deflector according to one embodiment of the present invention.

Referring to FIG. 18, a conveyor belt 202, which is disposed horizontally to convey transfer paper (not graphically illustrated) fed from a paper feed cassette 201, is provided in the lower part of the laser printer (image forming apparatus). A photosensitive body 203Y for yellow (Y), a photosensitive body 203M for magenta (M), a photosensitive body 203C for cyan (C), and a photosensitive body 203K for black (K) are disposed at equal intervals in the order described from the upstream side on the conveyor belt 202. In the following, the additional letters Y, M, C, and K are added appropriately to reference numerals in order to distinguish between the corresponding colors.

These photosensitive bodies 203Y, 203M, 203C, and 203K are formed to have the same diameter. Process members are disposed in order around each of the photosensitive bodies 203Y, 203M, 203C, and 203K in accordance with the process of electrophotography.

Taking the photosensitive body 203Y as an example, a charger 204Y, an optical scanning device 205Y, a development unit 206Y, a transfer charger 207Y, a cleaning unit 208Y, etc., are disposed in this order around the photosensitive body 203Y. This is the same with the other photosensitive bodies 203M, 203C, and 203K. That is, according to this embodiment, each of the photosensitive bodies 203Y, 203M, 203C, and 203K serves as a surface to be illuminated (illumination surface) for the corresponding color. The optical scanning devices 205Y, 205M, 205C, and 205K are provided for the photosensitive bodies 203Y, 203M, 203C, and 203K, respectively, with a one-to-one correspondence. The optical scanning devices 205Y, 205M, 205C, and 205K are integrated into an optical scanning device 231.

Further, registration rollers 209 and a belt charger 210 are provided around the conveyor belt 202 so as to be positioned on the upstream side of the photosensitive body 203Y. Further, a belt separation charger 211, a discharging charger 212, a cleaning unit 213, etc., are provided in order around the conveyor belt 202 so as to be positioned on the downstream side of the photosensitive body 203K. A fusing unit 214 is provided on the downstream side of the belt separation charger 211 in the paper conveyance direction. The fusing unit 214 is connected to a paper output tray 215 through paper output rollers 216.

In the above-described configuration, for example, at the time of a full-color (multicolor) mode, the optical scanning devices 205Y, 205M, 205C, and 205K perform optical scanning with respective light beams so as to form respective electrostatic latent images on the corresponding photosensitive bodies 203Y, 203M, 203C, and 203K based on respective image signals for the colors of Y, M, C, and K. These electrostatic latent images are developed into toner images with toners of the corresponding colors, and are successively transferred onto transfer paper so as to be superposed on one another. The transfer paper is conveyed, being electrostatically attracted and adhered to the conveyor belt 202. The toner images of the respective colors superposed on one another on the transfer paper are fixed onto the transfer paper as a full-color image by the fusing unit 214. The transfer paper on which the full-color image is fixed is output onto the paper output tray 215 by the paper output rollers 216.

At the time of a black-color mode (monochrome mode), the photosensitive bodies 203Y, 203M, and 203C and their respective process members are made inactive, and the optical scanning device 205K performs optical scanning with a light beam based on an image signal for black color so that an electrostatic latent image is formed only on the photosensitive body 203K.

This electrostatic latent image is developed into a toner image with black toner, and is transferred onto the transfer paper electrostatically attracted and adhered to the conveyor belt 202 and conveyed thereon. The toner image transferred onto the transfer paper is fixed onto the transfer paper as a monochrome image by the fusing unit 214. The transfer paper on which the monochrome image is fixed is output onto the paper output tray 215 by the paper output rollers 216.

Thus, an optical scanning device according to one embodiment of the present invention is applicable to a tandem full-color laser printer. According to a tandem full-color laser printer 90 to which a light deflector according to one embodiment of the present invention is applied, a change in the temperature of optical components such as a lens due to the heat generation of a light deflector 300, shared by the optical scanning devices 205Y, 205M, 205C, and 205K and including two mirrors formed in tiers in axial directions, is reduced. As a result, a scanning beam is constant in shape, thus making it possible to perform optical scanning with stability.

Fifth Embodiment

Figure 19:
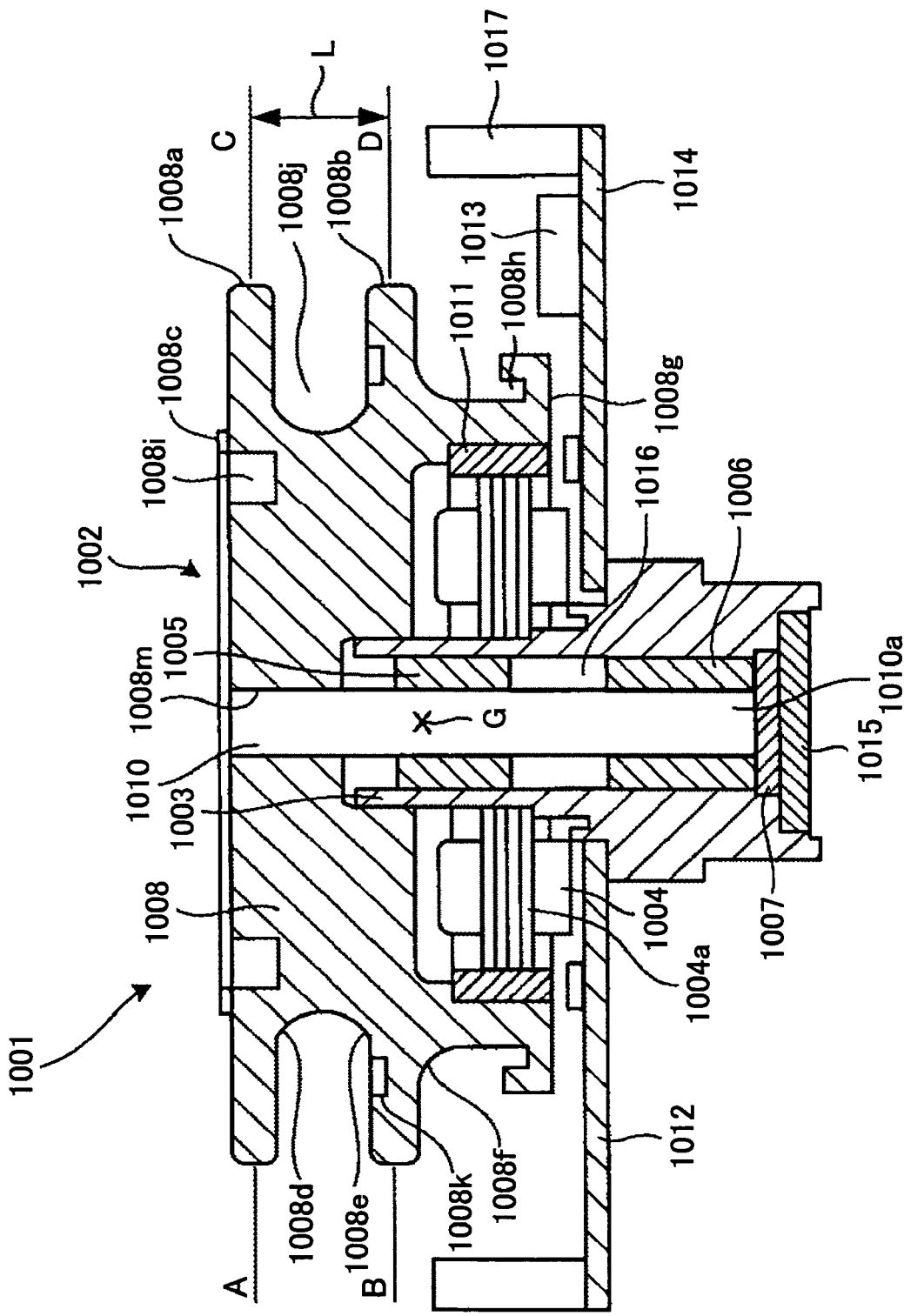
FIG. 19 is a longitudinal cross-sectional view of a polygon scanner as a light deflector according to a fifth embodiment of the present invention.

FIG. 19 is a longitudinal cross-sectional view of a polygon scanner (also referred to as "polygon mirror") 1001 as a light deflector employed in a color image forming apparatus according to a fifth embodiment of the present invention. Each of polygon mirror reflection surfaces 1008a and 1008b apart from each other in the axial directions of the polygon scanner 1001 forms a polygon mirror (rotary polygon mirror). Multiple laser beams A, B, C, and D corresponding to respective colors are made incident on corresponding four surfaces of the polygon mirror reflection surfaces 1008a and 1008b so that the laser beams A, B, C, and D are deflected to perform scanning at high speed. Specifically., the laser beams A and C are made incident on corresponding two surfaces of the polygon mirror reflection surface 1008a which surfaces oppose each other axially symmetrically, and the laser beams B and D are made incident on corresponding two surfaces of the polygon mirror reflection surface 1008b which surfaces oppose each other axially symmetrically.

The polygon scanner 1001 includes a bearing shaft 1010 formed of martensite-based stainless steel. The exterior surface of the upper part of the bearing shaft 1010 is fixed by shrink fitting to a rotary member 1008 of aluminum purity 99.9% or higher. The rotary member 1008 includes the polygon mirror reflection surfaces 1008a and 1008b. Martensite-based stainless steel (for example, SUS420J2) can be subjected to hardening so that it is possible to increase its surface hardness. Thus, martensite-based stainless steel has excellent resistance to abrasion, and is suitable for a bearing shaft. A rotor magnet 1011 is fixed to the interior surface of the lower part of the rotary member 1008. The rotor magnet 11 and a stator assembly including a stator core 1004a and winding coils 1004 form a DC brushless motor of an outer rotor type.

Each of the polygon mirror reflection surfaces 1008a and 1008b has a sufficient area to deflect predetermined laser beams. A space part 1008j separating the polygon mirror reflection surfaces 1008a and 1008b is shaped to have a diameter smaller than the inscribed circle diameter of each of the polygon mirror reflection surfaces 1008a and 1008b. Providing the space part 1008j with a smaller diameter makes it possible to effectively reduce windage that increases with an increase in rotation. This is highly effective in the area of rotations higher than or equal to 25,000 rpm in particular. The vertical distance L between the laser beams A and B (C and D) is determined by the vertical distance between fθ lenses that the laser beams A and B (C and D) pass after being deflected by the polygon mirror reflection surfaces 1008a and 1008b. The smaller the distance L, the smaller the surface area of the polygon scanner 1001 and thus the entire windage.

Unlike the conventional configuration, the configuration according to this embodiment does not require use of a fixation member such as a leaf spring in the polygon mirror 1001. Accordingly, there is the advantage that the polygon mirror reflection surfaces 1008a and 1008b are not distorted by the fixation pressure of the fixation member. Circumferential grooves (recesses) 1008i and 1008k provided in the rotary member 1008 are used as an adhesive agent application part for balance correction and for preventing stress distortion of the polygon mirror reflection surfaces 1008a and 1008b due to fixation of the bearing shaft 1010 by shrink fitting or a change in environmental temperature. The rotor magnet 1011 is a bonded magnet using resin as binder. The exterior part of the rotor magnet 1011 is held by the rotary member 1008 so as to prevent occurrence of damage due to centrifugal force at the time of high-speed rotation. By press-fitting and fixing the rotor magnet 1011 to the rotary member 1008, it is possible to keep the rotary body balance highly accurate without causing a slight movement of the fixed part even with rotations at higher speed and in a higher temperature environment.

The rotor magnet 1011 may be an aluminum-manganese-based magnet. In this case, the rotor magnet 1011 forms a rotary body 1002 together with the rotary member 1008 having a high aluminum purity of 99.9% or higher and the aluminum-alloy bearing shaft 1010 whose surface is hardened or lubricated. Thereby, the entire rotary body 1002 is formed of aluminum or an aluminum alloy so that there is substantially the same difference in thermal expansion between the components of the rotary body 1002, thereby preventing a slight move between the components due to an increase in temperature. As a result, it is possible to maintain the highly accurate balance of the rotary body 1002. In this case, for example, the following effects are produced. The aluminum-manganese-based magnet has high mechanical strength so as not to be damaged even by centrifugal force at the time of high-speed rotation. The polygon mirror reflection surfaces 1008a and 1008b formed of high-purity aluminum have high reflectance. The bearing shaft 1010 can be lighter with an aluminum alloy than with stainless steel.

In order to reduce the width of the image forming apparatus, an optical scanning device and the polygon mirror 1001 are used, being inclined with respect to their axially vertical directions. The center of gravity G of the rotary body 1002 is disposed between an upper bearing 1005 and a lower bearing 1006 supporting the bearing shaft 1010 rotatably. As a result, it is possible to prevent uneven abrasion of the upper and lower bearings 1005 and 1006 against the above-described inclined usage. The upper and lower bearings 1005 and 1006 disposed on the upper side and lower side, respectively, between the exterior side of the bearing shaft 1010 and the interior side of a fixed sleeve 1003 form a radial bearing. The radial bearing is an oilless bearing. The gap of this bearing is 10 μm or less in diameter. It is suitable to provide a dynamic pressure generating groove (not graphically illustrated) in order to circulate contained oil efficiently even at a high-speed rotation of 25,000 rpm. This dynamic pressure generating groove may be provided either on the exterior surface of the bearing shaft 1010 or on the interior surfaces of the upper and lower bearings 1005 and 1006 that are sintered members. It is suitable to provide the dynamic pressure generating groove on the interior surface of the rotary member 1008 having excellent processability. The stator core 1004a is fixed to the fixed sleeve 1003.

The axial bearing is a pivot bearing including a thrust receiving member 1007. The thrust receiving member 1007 is provided opposite a convex curved surface 1010a formed at the lower end surface of the bearing shaft 1010 so as to be in contact therewith. Martensite-based stainless steel, ceramic, or a metal member having its surface subjected to hardening such as DLC (diamond-like carbon) processing is suitable for the thrust receiving member 1007 because generation of abrasion powder is controlled as much as possible. The thrust receiving member 1007 is supported by a support member 1015 fixed to the fixed sleeve 1003.

It is also possible to support the rotary body 1002 axially by the radial magnetic attraction between the stator core 1004a and the rotor magnet 1011. In this case, the magnetic attraction generated is greater than or equal to the mass of the rotary body 1002. Accordingly, a desired bearing force can be obtained by using a rare earth-based magnet for the rotor magnet 1011 and/or narrowing the magnetic gap between the rotor magnet 1011 and the stator core 1004a. Further, the rotary body 1002 has the damping characteristic of quickly controlling its vibration with a hermetically sealed space 1016 formed between the bearing shaft 1010 and the oilless bearing when an impact is applied to the rotary body 1002.

In the case of causing the rotary body 1002 to rotate at a high speed of 25,000 rpm or over, the balance of the rotary body 1002 should be corrected and maintained with high accuracy in order to reduce vibration. The rotary body 1002 has an imbalance corrector part. Balance correction is performed by applying an adhesive agent to the circumferential groove 1008i or 1008k above the center of gravity G and to a circumferential recess part 1008h below the center of gravity G. The rotary body 1002 needs an imbalance of 10 mg·mm or less. For example, the correction is kept 1 mg or less at a radial position of 10 mm. In the case of performing fine correction as described above, if it is difficult to perform fine control with an adhesive such as an adhesive agent, or if the adhesive agent is small in amount and has only a weak adhesive force so as to come off and scatter at a high-speed rotation of 40,000 rpm or over, it is suitable to delete part of the components of the rotary body 1002 (by cutting with a drill or by laser processing).

The motor system according to this embodiment is one referred to as an outer rotor type where a magnetic gap is provided in a radial direction and the rotor magnet 1011 is provided at the outside diameter part of the stator core 1004a. A driver IC 1013 as a driving part rotates the rotary body 1002 by switching excitation of the winding coils 1004, referring to the output signals of Hall elements 1012 as position signals. The Hall elements are mounted on a circuit board 1014 as position detecting elements to detect the position of the rotor magnet 1011 by detecting the magnetic field of the rotor magnet 1011. The rotor magnet 1011 is radially magnetized. The rotor magnet 1011 generates running torque at the exterior surface of the stator core 1004a, and rotates. The rotor magnet 1011 opens its flux path in the directions of its outside diameter and height. The rotor magnet 1011 does not open its flux path in the direction of its inside diameter. The Hall elements 1012 for switching motor excitation are disposed in the open flux path of the rotor magnet 1011.

The magnetic circuit of the rotor magnet 1011 is open. Accordingly, it is suitable to dispose a magnetic shield member 1017 around the rotary body 1002. It is suitable to form the magnetic shield member 1017 of a non-conductive material such as resin. This is because if a conductive material such as a steel plate is provided nearby, the leakage flux of the rotor magnet 1011 caused by high-speed rotation generates eddy current, thereby increasing motor loss.

The polygon mirror reflection surfaces 1008a and 1008b are subjected to mirror finishing at least after the bearing shaft 1010 and the rotary member 1008 are fixed by shrink fitting. The polygon mirror reflection surfaces 1008a and 1008b may be subjected to mirror surface processing with reference to the outside diameter of the bearing shaft 1010. Alternatively, the polygon mirror reflection surfaces 1008a and 1008b may be subjected to mirror surface processing with reference to a lower end surface 1008g of the rotary member 1008. Alternatively, the polygon mirror reflection surfaces 1008a and 1008b may be subjected to mirror surface processing with reference to an upper end surface 1008c of the rotary member 1008. The mirror finishing is performed with high accuracy with reference to the outside diameter of the bearing shaft 1010, the lower end surface 1008g of the rotary member 1008, or the upper end surface 1008c of the rotary member 1008. In the case of performing mirror finishing with reference to the upper end surface 1008c or the lower end surface 1008g of the rotary member 1008, highly accurate processing is required in advance so that the runout with respect to the center of the axial outside diameter is 5 μm or less. The runout accuracy affects flatness and face tangle quality. The part of the rotary member 1008 other than the part of the polygon mirror reflection surfaces 1008a and 1008b has a diameter (sufficient if larger than or equal to 0.1 mm) smaller than the circumscribed circle diameter in order to prevent the point of a cutting tool (edge tool) from colliding with the outside diameter part of the rotary member 1008 at the time of mirror finishing.

The rotary member 1008 is formed as follows. First, a prism-like blank having as many sides as the number of reflection surfaces is made with a mold (by die casting, forging, or extrusion). Thereafter, an interior surface 1008m defining a cylindrical space into which the bearing shaft 1010 of the rotary member 1008 is inserted and shrink-fitted is processed with high accuracy (so as to have a cylindricity of 3 μm). Thereafter, the space part 1008j separating the upper and lower reflection surfaces 1008a and 1008b, the circumferential groove 1008h, and their peripheral part are processed by cutting. In this processing, the corner shape of each of outside diameter parts 1008d, 1008e, and 1008f adjacent to the polygon mirror reflection surfaces 1008a and 1008b of the rotary member 1008 is rounded. Practically, the rounded shape has a radius less than or equal to the thickness of each of the polygon mirror reflection surfaces 1008a and 1008b. For example, if the thickness of the polygon mirror is 3 mm, the radius of each corner part is less than or equal to 3 mm. This reduces deformation with respect to a cutting load imposed in the cutting directions of the tool (the upward and downward directions in FIG. 19) at the time of mirror finishing, thus producing the effect of increasing rigidity.

Thereafter, the bearing shaft 1010 is shrink-fitted to the rotary member 1008, and mirror finishing is performed on the polygon mirror reflection surfaces 1008a and 1008b. The cutting chips of the upper and lower polygon mirror reflection surfaces 1008a and 1008b resulting from mirror finishing escape to the space part 1008j. Accordingly, it is possible to prevent scratches by cutting chips. This process eliminates the necessity of making highly accurate the flatness and angularity of a polygon mirror mounting surface, which is conventionally required in order to maintain a face tangle characteristic.

Figure 20:
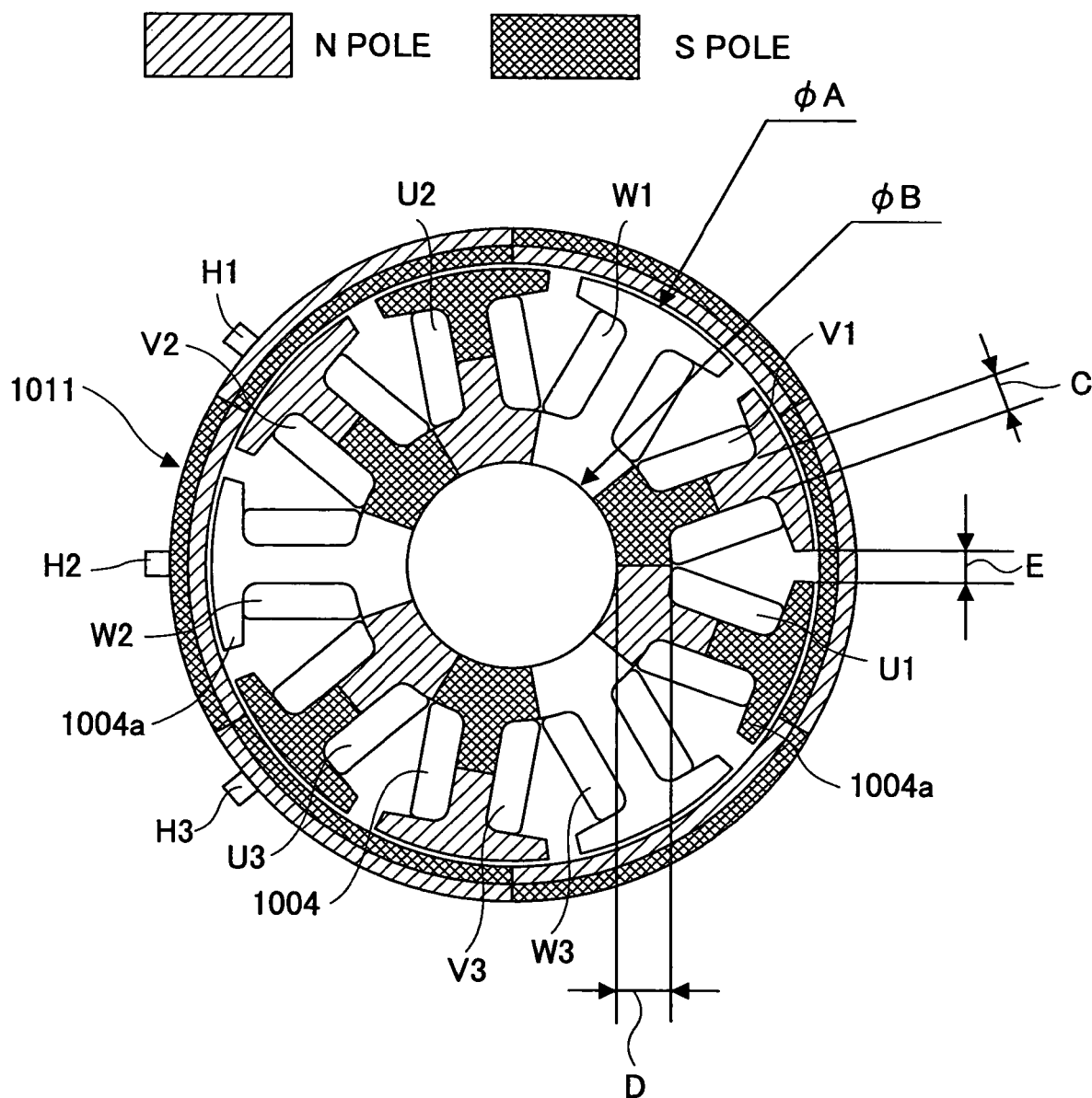
FIG. 20 is a diagram showing the configuration of a motor part at a cross section perpendicular to a rotation center axis according to the fifth embodiment of the present invention.
Figure 21:
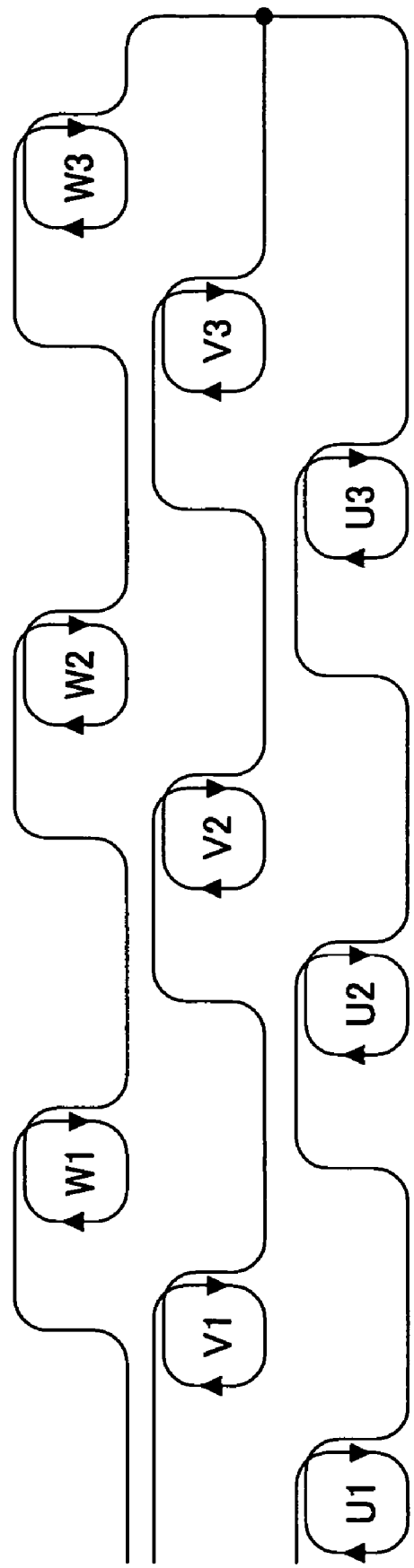
FIG. 21 is a diagram for illustrating a method of winding coils according to the fifth embodiment of the present invention.
Figure 22:
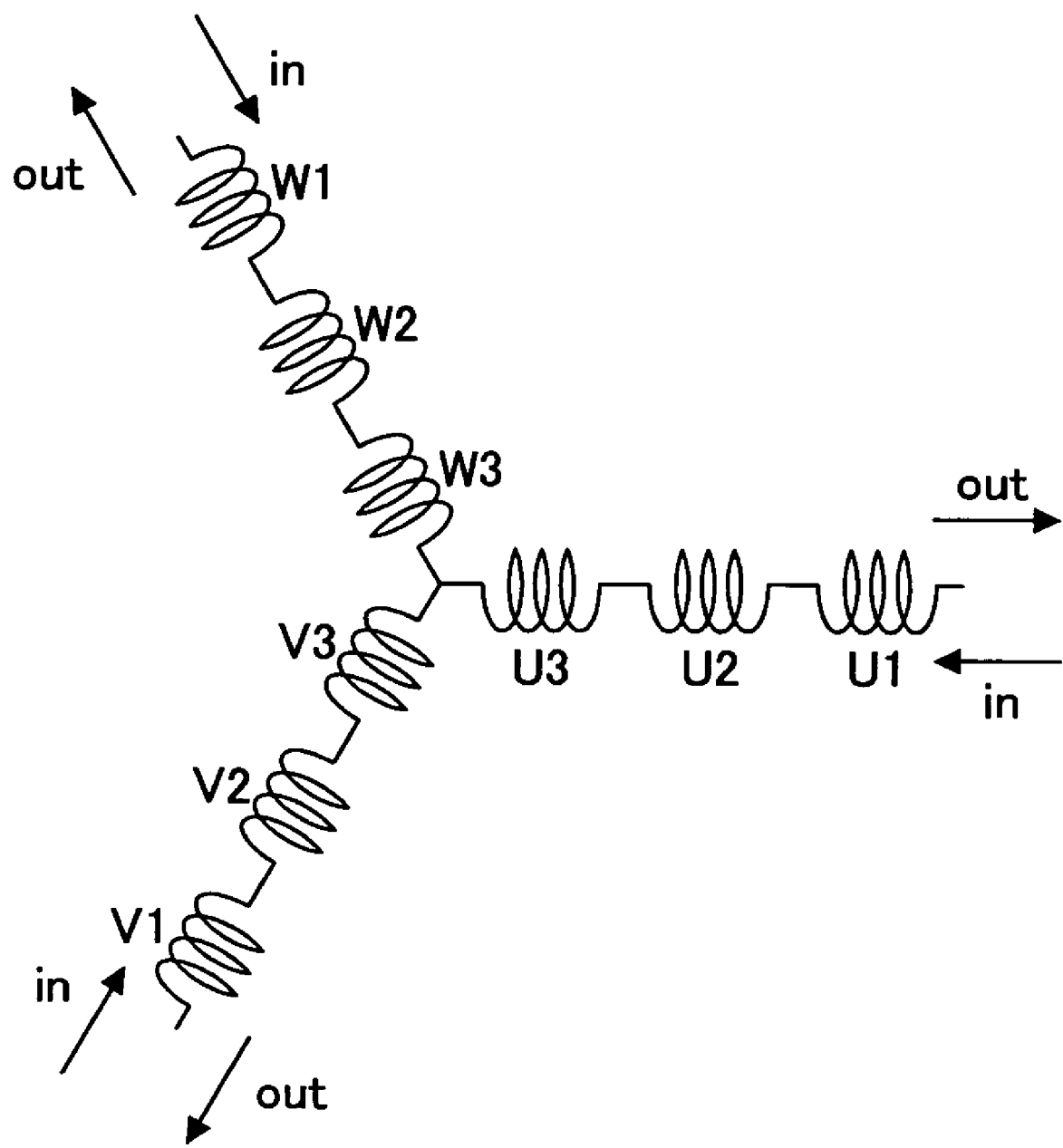
FIG. 22 is a coil development according to the fifth embodiment of the present invention.

Next, a description is given, with reference to FIGS. 20 through 22, of a configuration and an operation of a motor part according to this embodiment. In FIGS. 20 through 22, the same reference marks (U1 through U3, V1 through V3, W1 through W3, and H1 through H3) as in FIGS. 10 through 12 are used for convenience of description.

FIG. 20 is a diagram showing the configuration of the motor part at a cross section perpendicular to the rotation center axis according to this embodiment. The rotor magnet 1011, which is an annular permanent magnet, is circumferentially magnetized with six poles. The stator core 1004a is disposed inside the rotor magnet 1011 with a predetermined magnetic gap being provided therebetween. The stator core 1004a includes a center hole for fixation and radially formed nine salient poles, around which the corresponding winding coils 1004 (U1 through U3, V1 through V3, and W1 through W3) are wound.

FIG. 21 is a diagram for illustrating a method of winding coils 1004. FIG. 21 is a development viewed from the permanent magnet (rotor magnet) 1011 side. Referring to FIG. 21, the coils 1004 of each phase, that is, the coils U1 through U3, the coils V1 through V3, and the coils W1 through W3, respectively, are wound in the same direction and connected so that the magnetic poles generated on the corresponding surface opposing the permanent magnet 1011 (the corresponding exterior surface of the stator core 1004a) when energized have the same polarity. The three sets of coils of the three phases U, V, and W are connected to one another by a Y-connection as shown in FIG. 22. The three coils U1 through U3 of the U phase are connected in series. The three coils V1 through V3 of the V phase are connected in series. The three coils W1 through W3 of the W phase are connected in series.

One end of each of the group of the coils U1 through U3 of the U phase, the group of the coils V1 through V3 of the V phase, and the group of the coils W1 through W3 of the W phase is connected to the driver IC 1013 (FIG. 19). The driver IC 1013 sequentially switches the phases of the coil groups to be energized so as to generate a rotating magnetic field, thereby rotating the rotary body 1002. Three position detecting elements H1, H2, and H3 are disposed at intervals of 40° so as to detect the rotational position of the rotor magnet 1011. The driver IC 1013 selects those of two phases to be energized from the groups of the coils U1 through U3, V1 through V3, and W1 through W3 based on position detection signals from the position detecting elements H1, H2, and H3. Magnetoelectric conversion devices such as Hall elements may be employed as the position detecting elements H1, H2, and H3.

FIG. 20 shows the state where the coils U1 through U3 and V1 through V3 of the two phases of U and V are selected by the driver IC 1013 to be energized and excited when the position detecting elements H1, H2, and H3 detect N, S, and N poles, respectively. Referring further to FIG. 22, a current flows in from the coil U1 and flows out from the coil V1, thereby generating an S pole in the salient poles of U1 through U3 and an N pole in the salient electrode of V1 through V3. As a result, magnetic repulsion or magnetic attraction is exerted between the permanent magnet 1011 and the salient poles U1 through U3 and V1 through V3, so that the permanent magnet 1011 is rotated counterclockwise.

The rotor magnet 1011 is circumferentially magnetized with six poles with reversal of poles between the interior side and the exterior side. The position detecting elements H1, H2, and H3 may be disposed on the interior side of the rotor magnet 1011, but magnetic noise is on their position detection signals detecting the position of the rotor magnet 1011 because of the effect of switching of excitation of the coils 1004 in the stator. Accordingly, it is better to dispose the position detecting elements H1, H2, and H3 on the exterior side of the rotor magnet 1011.

Referring to FIG. 20, according to this embodiment, letting the diameter of a circumscribed circle formed by the nine salient poles of the stator core 1004*a* be A, the center hole of the stator core 1004*a* is formed so that its diameter B falls within the range of 35±10% of the circumscribed circle diameter A.

The diameter B of the center hole of the stator core 1004*a* is more than or equal to 25% of the circumscribed circle diameter A in order to make it possible to increase the speed of rotation of the rotary body 1002 up to high rpms without causing unnecessary vibration. The bearings 1005 and 1006 are disposed in the center hole of the stator core 1004*a*. If the diameter B of the center hole of the stator core 1004*a* is less than 25% of the circumscribed circle diameter A, the bearings 1005 and 1006 disposed in the center hole of the stator core 1004*a* are reduced in size. As a result, sufficient bearing rigidity cannot be obtained, so that it is impossible to increase the speed of rotation up to high rpms. Further, the fixation force of the bearing 1006 fixed at the lower end part of the stator core 1004*a* is reduced, so that the natural frequency becomes low. As a result, oscillation is caused by vibration due to rotor residual unbalance, so that it is impossible to increase the speed of rotation up to high rpms.

On the other hand, the diameter B of the center hole of the stator core 1004*a* is less than or equal to 45% of the circumscribed circle diameter A in order to reduce power loss due to the resistance of the coils 1004. Each coil 1004 requires a winding of 30-50 turns. If the diameter B of the center hold is increased, the cross-sectional area of each part of the stator core 1004*a* around which the corresponding coil 1004 is wound is reduced, so that it is necessary to use a wire small in diameter (thin wire). As a result, the resistance of each coil 1004 increases, thus increasing a voltage drop and power loss (copper loss) due to the resistance of the coil 1004. In motors for a light deflector, the circumscribed circle diameter A is 10-30 mm. Accordingly, if the diameter B of the center hole is 5-14 mm, it is possible to ensure a necessary cross-sectional area of the coil winding part of the stator core 1004*a*.

Figure 23:
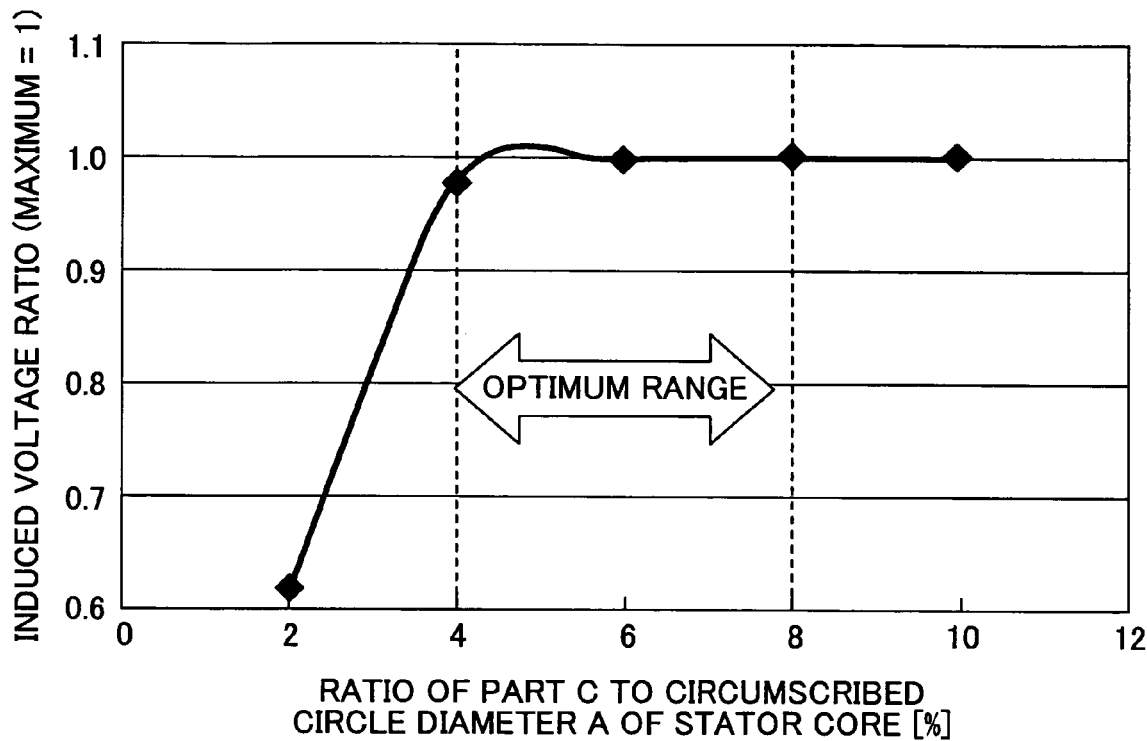
FIG. 23 is a graph showing the relationship between the ratio of the width C of the coil winding part of a stator core to the circumscribed circle diameter A of the stator core and induced voltage ratio whose maximum value is 1 according to the fifth embodiment of the present invention.
Figure 24:
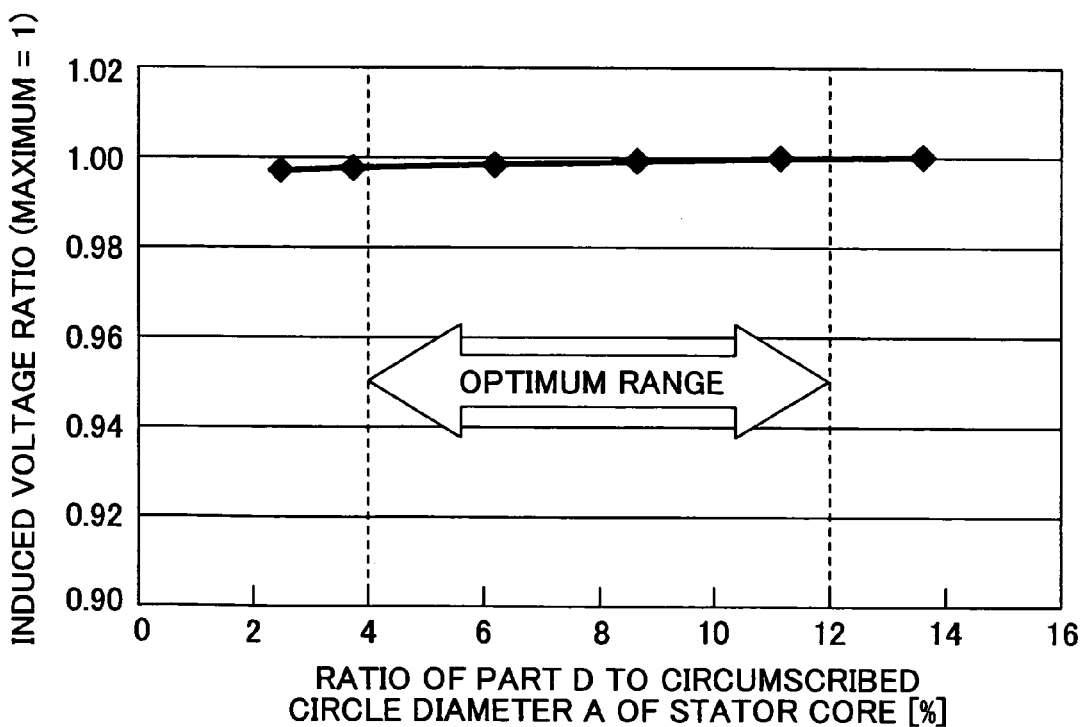
FIG. 24 is a graph showing the relationship between the ratio of the width D of the connecting part connecting the adjacent salient poles of the stator core to the circumscribed circle diameter A of the stator core and the induced voltage ratio whose maximum value is 1 according to the fifth embodiment of the present invention.
Figure 25:
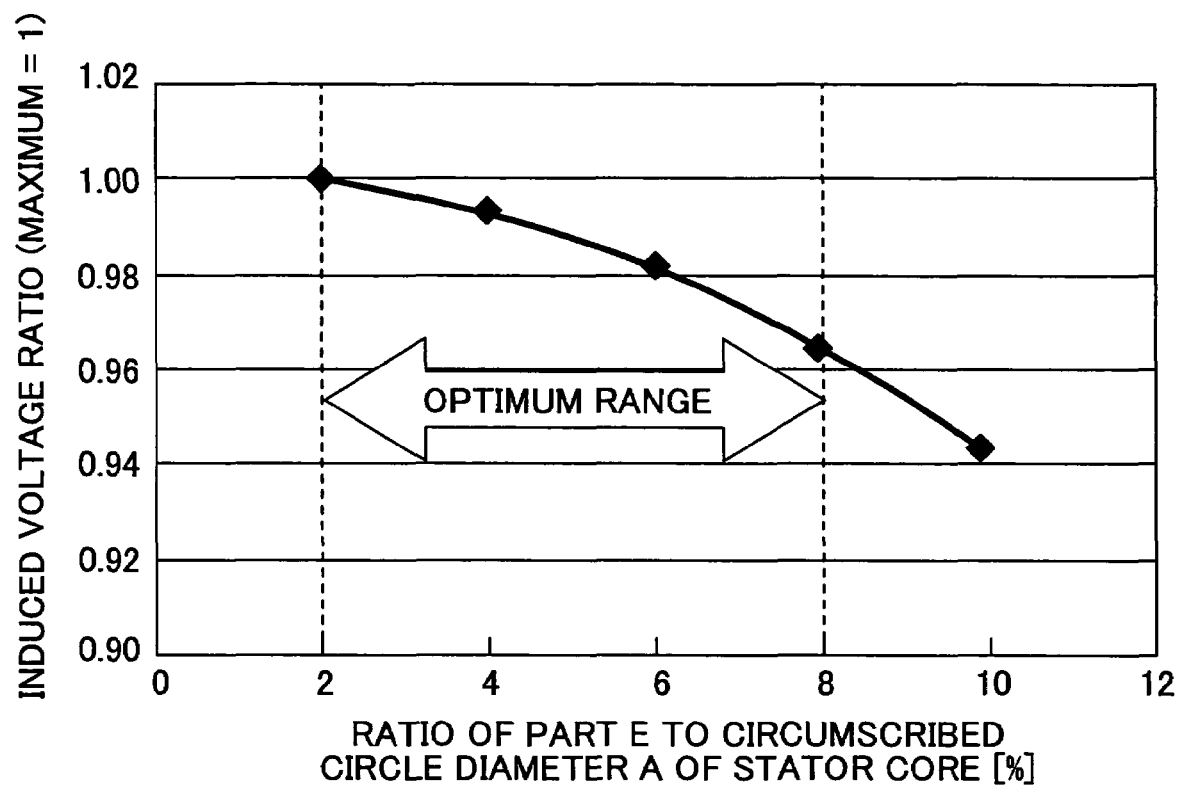
FIG. 25 is a graph showing the relationship between the ratio of the width E of a magnetic gap part formed between each adjacent two of the salient poles of the stator core to the circumscribed circle diameter A of the stator core and the induced voltage ratio whose maximum value is 1 according to the fifth embodiment of the present invention.

With the diameter B of the center hole being in the above-described range, an electromagnetic field analysis by FEM was conducted using the shapes (dimensions) C, D, and E of the stator core 1004*a* shown in FIG. 20 as parameters, thereby comparing induced voltages at the time of no-load rotation (non-energized rotation). The induced voltages are alternating voltages induced between the U and V phases, the V and W phases, or the W and U phases of the coils 1004 due to an alternating field generated by the rotating rotor magnet 1011. In the case of rotation as a motor, a rotating magnetic field is generated by switching energization of the coils 1004 of the phases U, V, and W. At this point, driving torque proportional to induced voltage is generated. Each of FIGS. 23 through 25 shows comparison of effective values of induced voltage with respect to an effective range at the time of energization and driving according to this embodiment. The higher the induced voltage, the higher the efficiency.

FIG. 23 shows the relationship between the ratio of the width C of the coil winding part of the stator core 1004*a* to the circumscribed circle diameter A of the stator core 1004*a* and the induced voltage ratio whose maximum value is 1. As shown in FIG. 23, when the circumferential width C of the coil winding part of the stator core 1004*a* is less than 4% of the circumscribed circle diameter A, the induced voltage sharply decreases. Accordingly, it is preferable that the width C be greater than or equal to 4% of the circumscribed circle diameter A. However, an increase in the width C of the coil winding part of the stator core 1004*a* reduces the cross-sectional area of the coil winding part of the stator core 1004*a*, so that it is necessary to use a wire small in diameter (thin wire) for each coil 1004. As a result, the resistance of the coil 1004 increases, thus increasing a voltage drop and power loss (copper loss) due to the resistance of the coil 1004. Therefore, it is preferable that the width C be less than or equal to 8% of the circumscribed circle diameter A.

That is, it is preferable that the width C of the coil winding part of the stator core 1004*a* fall within the range of 4-8% of the circumscribed circle diameter A.

FIG. 24 shows the relationship between the ratio of the width D of the connecting part connecting the adjacent salient poles of the stator core 1004*a* to the circumscribed circle diameter A of the stator core 1004*a* and the induced voltage ratio whose maximum value is 1. As shown in FIG. 24, the radial width D of the connecting part of the stator core 1004*a* has a relatively small effect on induced voltage. However, if the width D is too small, it is difficult to punch out the stator core 1004*a*. Accordingly, it is preferable that the width D be greater than or equal to 4% of the circumscribed circle diameter A. On the other hand, if the width D is too large, the cross-sectional area of the coil winding part of the stator core 1004*a* is reduced, so that it is necessary to use a wire small in diameter (thin wire) for each coil 1004. As a result, the resistance of the coil 1004 increases, thus increasing a voltage drop and power loss (copper loss) due to the resistance of the coil 1004. Therefore, it is preferable that the width D be less than or equal to 12% of the circumscribed circle diameter A.

That is, it is preferable that the width D of the connecting part connecting the adjacent salient electrode of the stator core 1004*a* fall within the range of 4-12% of the circumscribed circle diameter A.

FIG. 25 shows the relationship between the ratio of the width E of a magnetic gap part formed between each adjacent two of the salient poles of the stator core 1004*a* to the circumscribed circle diameter A of the stator core 1004*a* and the induced voltage ratio whose maximum value is 1. As shown in FIG. 25, the smaller the width E, the greater the induced voltage. It is preferable that the width E be less than or equal to 8% of the circumscribed circle diameter A so that a reduction in the induced voltage is less than or equal to several %. However, there should be a gap greater than the thickness of the coil 1004 as a passage through which the coil 1004 passes at the time of winding the coil 1004. Usually, a wire of 0.2 mm or larger in diameter is used as a coil in motors for a light deflector. Accordingly, the width E is required to be greater than or equal to 2% of the circumscribed circle diameter A.

That is, it is preferable that the width E of a magnetic gap part formed between each adjacent two of the salient poles of the stator core 1004*a* fall within the range of 2-8% of the circumscribed circle diameter A.

According to this embodiment, the following effects are produced.

It is possible to provide a DC brushless motor where the number of magnetic poles and the number of coils of the motor are six and nine, respectively, in which it is possible to reduce the windage of a motor part by reducing the diameter A of a circumscribed circle formed by the nine salient poles of the stator core 1004*a*, it is possible to dispose a bearing in the center hole part of the stator core 1004*a* although the stator core 1004*a* is reduced in size, and it is possible to provide the stator core 1004*a* with such a shape as to prevent loss (copper loss) due to the winding resistance of a coil from increasing, so that it is possible to improve motor efficiency at high-speed rotation and thus to reduce power consumption.

It is possible to reduce power consumption by optimizing the width C of each part of the stator core 1004*a* around which the corresponding coil 1004 is wound.

It is possible to reduce power consumption by optimizing the width D of the part of the stator core 1004*a* which part connects the adjacent salient poles of the stator core 1004*a*.

It is possible to reduce power consumption by optimizing the width E of a magnetic gap part formed between each adjacent two of the salient poles of the stator core 1004*a*. Each of the optimum ranges of C, D, and E can produce the corresponding effect independently. However, a maximum effect is obtained when C, D, and E are optimized simultaneously.

It is possible to provide a light deflector capable of reducing power consumption by configuring its motor part as described above.

Sixth Embodiment

Figure 26:
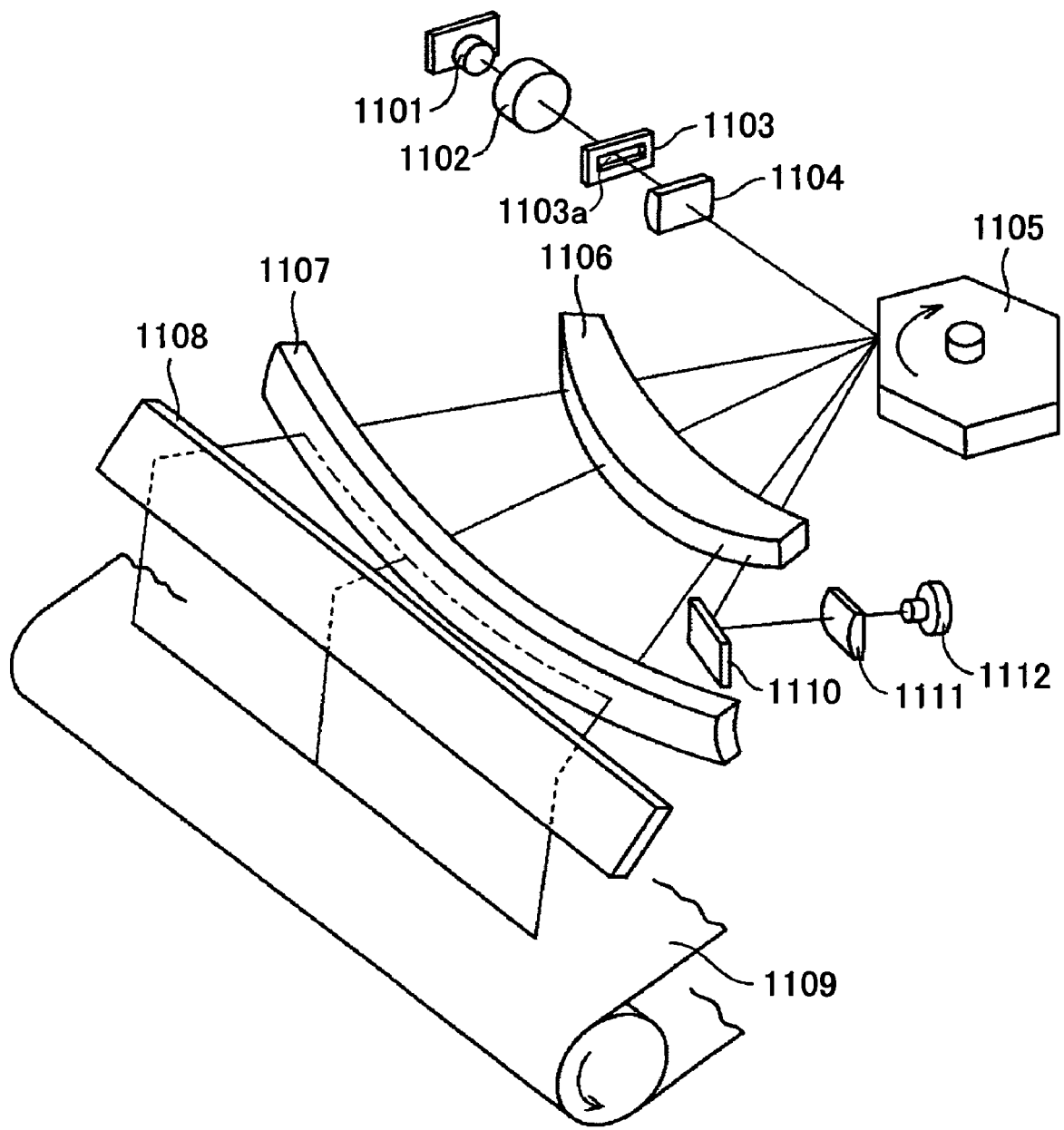
FIG. 26 is a perspective view of an optical scanning device according to a sixth embodiment of the present invention.

FIG. 26 is a schematic diagram showing part of an optical scanning device according to a sixth embodiment of the present invention. The optical scanning device of this embodiment includes a light deflector according to one embodiment of the present invention. This optical scanning device is of a single beam type. The optical scanning device according to this embodiment includes a light source 1101, a coupling lens 1102, an aperture 1103, a cylindrical lens 1104, a polygon mirror 1105 as a light deflector, lenses 1106 and 1107, a mirror 1108, a photosensitive body 1109 as a photosensitive medium, a mirror 1110, a lens 1111, and a light receiving element 1112.

The light source 1101 is a semiconductor laser device to emit a light beam for optical scanning. The light source 1101 is driven by a driver part (not graphically illustrated) in accordance with image data. The coupling lens 1102 adapts the light beam emitted from the light source 1101 to an optical system. The aperture 1103 forms the light beam from the coupling lens 1102 into a predetermined shape. The cylindrical lens 104 gathers the incident light beam from the aperture 1103 in the sub scanning direction. The polygon mirror 105 is a light deflector according to one embodiment of the present invention. The polygon mirror 1105 reflects the incident light from the cylindrical lens 1104 on its deflection reflection surface. The lenses 1106 and 1107 focus the light beam from the polygon mirror 1105 on the photosensitive body 1109. The mirror 1108 bends the optical path of the light beam from the lens 1107 so as to guide the light beam to the photosensitive body 1109. After being evenly charged with a charger (not graphically illustrated), the photosensitive body 1109 is scanned with the light beam from the mirror 1108 so that an electrostatic latent image is formed on the photosensitive body 1109. The mirror 1110 and the lens 1111 concentrate the light beam from the lens 1106 onto the light-receiving element 1112. The light-receiving element 1112 is a photodetector device such as a photodiode. The light-receiving element 1112 detects the light beam from the lens 1111 and generates a synchronization detection signal.

The light beam emitted from the light source 1101, which is a semiconductor laser device, is a divergent pencil of rays, and is coupled to the subsequent optical system by the coupling lens 1102. The form of the coupled light beam corresponds to the optical characteristics of the subsequent optical system. The light beam may be a slightly divergent pencil of rays, a slightly convergent pencil of rays, or a parallel pencil of rays. When the light beam passing through the coupling lens 1102 passes through an opening 1103*a* of the aperture 1103, the light beam is subjected to "beam shaping" with the opening 1103*a* blocking the peripheral part of the light beam where light intensity is low. Thereafter, the light beam enters the cylindrical lens 1104, which is a "linear imaging optical system." The cylindrical lens 1104 has a substantially half tube shape. The cylindrical lens 1104 has a powerless direction (a direction in which light is not refracted) in the main scanning direction, and has positive power (power to converge light) in the sub scanning direction. The cylindrical lens 1104 converges the incident light beam in the sub scanning direction, and concentrates the light beam on and around the deflection reflection surface of the polygon mirror 1105 serving as a "light deflector."

While being deflected in a constant angular velocity manner with the rotation of the polygon mirror 1105 at a constant velocity, the light beam reflected from the deflection reflection surface of the polygon mirror 1105 passes through the two lenses 1106 and 1107 forming a "scanning optical system," and has its optical path bent by the bending mirror 1108 so as to be focused into a light spot on the surface (photosensitive surface) of the photoconductive photosensitive body 1109 forming the substance of a "surface to be scanned" (scanning surface) and scan the scanning surface. The light beam is incident on the mirror 1110 before scanning the scanning surface, and is reflected to be gathered onto the light-receiving element 1112 by the lens 1111. The timing of writing onto the photosensitive body 1109 with the light beam is determined by a control part (not graphically illustrated) based on the output signal of the light-receiving element 1112. The single beam-type optical scanning device according to this embodiment may employ the polygon mirror 1001 of the fifth embodiment as the polygon mirror (light deflector) 1105. The light beam from the cylindrical lens 1104 is deflected by the reflection surface 1008*a* or 1008*b* of the polygon mirror 1001 so as to perform scanning.

According to the single beam-type optical scanning device according to this embodiment that uses the polygon mirror 1001 of the fifth embodiment as the polygon mirror (light deflector) 1105, it is possible to reduce power consumption and heat generation of the polygon mirror 1105 serving as a light deflector. Accordingly, it is possible to reduce a change in the temperature of optical components such as a lens due to the heat generation of the polygon mirror 1105. As a result, a scanning beam is constant in shape, thus making it possible to perform stable optical scanning.

Seventh Embodiment

Figure 27:
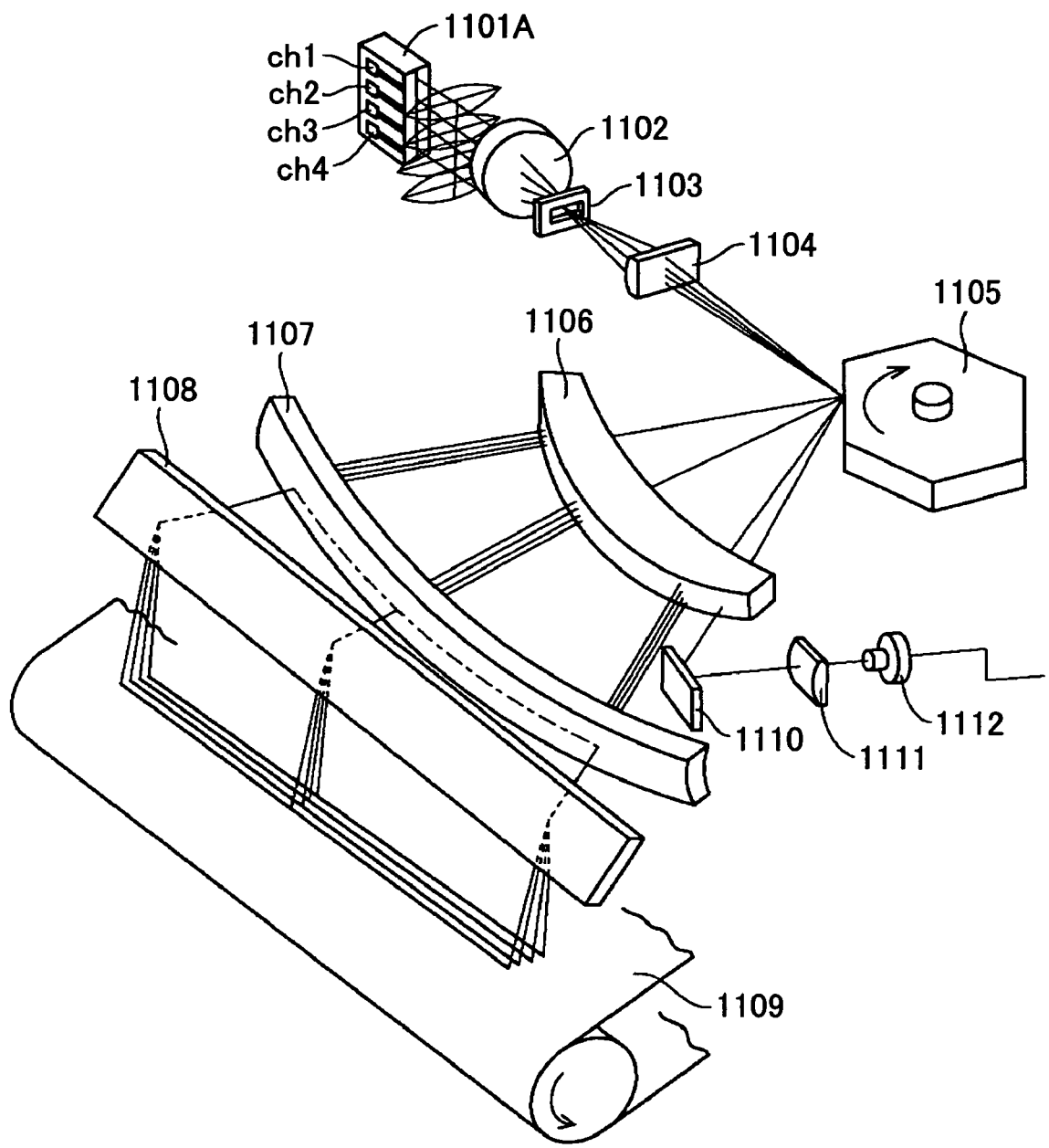
FIG. 27 is a perspective view of a multi-beam optical scanning device according to a seventh embodiment of the present invention.

FIG. 27 is a schematic diagram showing a multi-beam optical scanning device according to a seventh embodiment of the present invention. In FIG. 27, the same elements as those of FIG. 26 are referred to by the same numerals. According to this optical scanning device, a light source 1101A is a semiconductor laser array in which four light emission sources ch1 through ch4 are arranged at equal intervals in an array. In this embodiment, the light emission sources ch1 through ch4 are arranged in the sub scanning direction. Alternatively, the semiconductor laser array 101A may be inclined so that the direction of the light emission source array is inclined to the main scanning direction.

The four light emission sources ch1 through ch4 are driven by a driver part (not graphically illustrated) in accordance with image data so as to emit four respective light beams. Each of these four light beams is a divergent pencil of rays of which the long axis direction of the elliptic far field pattern is directed in the main scanning direction as shown in FIG. 27, and is coupled to the subsequent optical system by the coupling lens 1102 common to the four light beams. The form of each coupled light beam corresponds to the optical characteristics of the subsequent optical system. The light beam may be a slightly divergent pencil of rays, a slightly convergent pencil of rays, or a parallel pencil of rays.

Each of the four light beams passing through the coupling lens 1102 is subjected to "beam shaping" by the aperture 1103, and is converged in the sub scanning direction by the action of the cylindrical lens 1104 serving as a "common linear imaging optical system." The four light beams converged in the sub scanning direction form respective linear images having length in the main scanning direction, separated from one another in the sub scanning direction, on and around the deflection reflection surface of the polygon mirror 1105 serving as a "light deflector," and are deflected in a constant angular velocity manner.

The four light beams deflected in a constant angular velocity manner by the deflection reflection surface of the polygon mirror 1105 pass through the two lenses 1106 and 1107 forming a "scanning optical system," and have their respective optical paths bent by the bending mirror 1108. The four light beams having their respective optical paths bent are focused into four light spots separated in the sub scanning direction on the photosensitive surface of the photosensitive body 1109 forming the substance of the "scanning surface," so that four scanning lines on the scanning surface are simultaneously scanned by the polygon mirror 1105.

One of the four light beams is incident on the mirror 1110 and is gathered onto the light-receiving element 1112 by the lens 1111 before scanning the scanning surface. The timing of optical writing onto the photosensitive body 1109 by the four beams is determined by a control part (not graphically illustrated) based on the output signal of the light-receiving element 1112. The "scanning optical system" according to this embodiment is an optical system that focuses four beams simultaneously deflected by the polygon mirror 1105 as a light deflector into four light spots on the scanning surface of the photosensitive body 1109, and is configured by the two lenses 1106 and 1107. As the polygon mirror 1105 of this embodiment, the polygon mirror 1001 of the fifth embodiment may be employed. The light beams from the cylindrical lens 1104 are deflected by one of the two reflection surfaces 1008a and 1008b of the polygon mirror 1105 so as to perform scanning.

Thus, since the multi-beam-type optical scanning device according to this embodiment uses the polygon mirror 1001 of the fifth embodiment as the polygon mirror (light deflector) 1105, it is possible to reduce power consumption and heat generation of the polygon mirror 1105 serving as a light deflector. Accordingly, it is possible to reduce a change in the temperature of optical components such as a lens due to the heat generation of the polygon mirror 1105. As a result, a scanning beam is constant in shape, thus making it possible to perform stable optical scanning.

Eighth Embodiment

Figure 28:
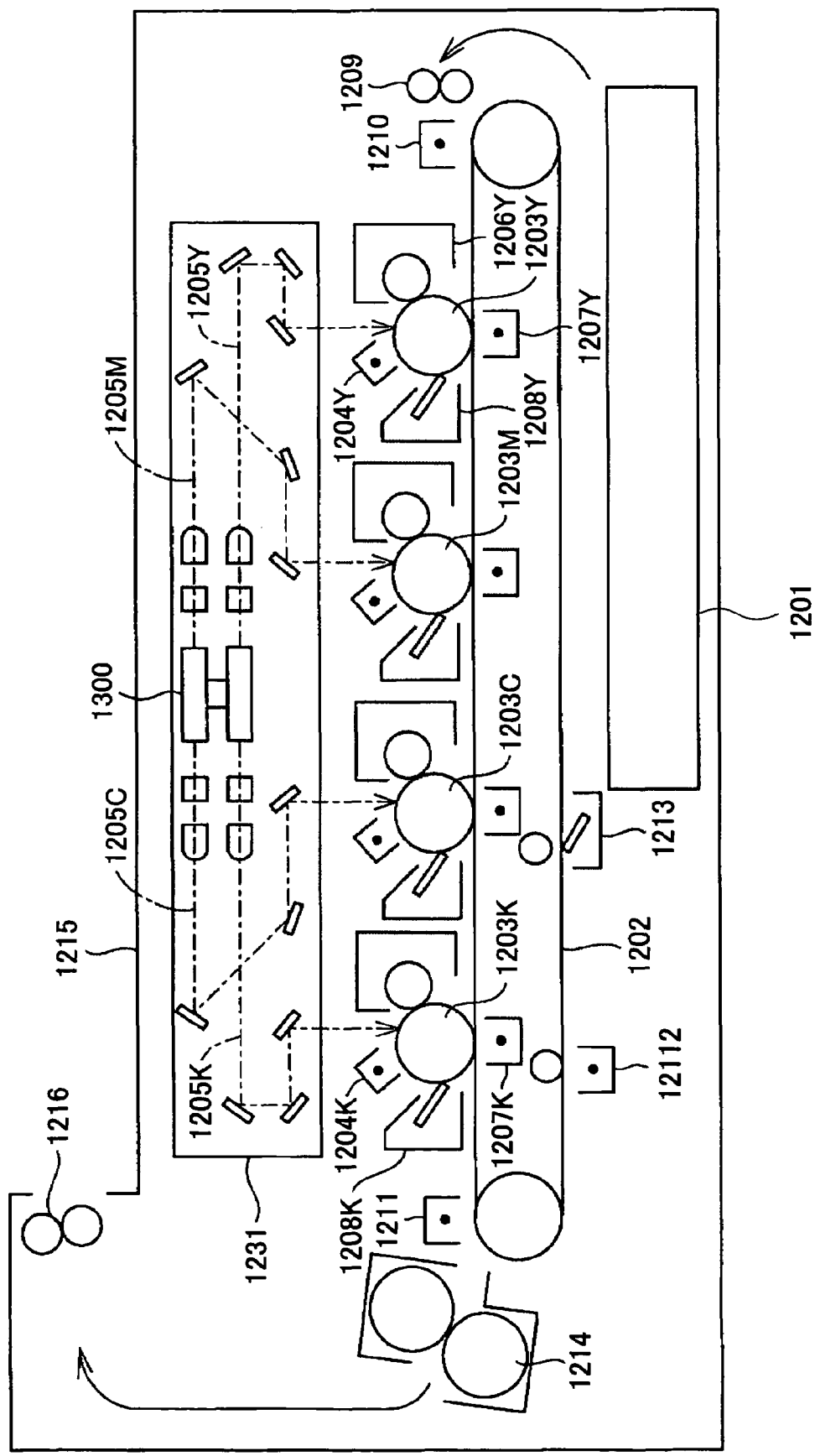
FIG. 28 is a diagram showing an image forming apparatus according to an eighth embodiment of the present invention.

FIG. 28 is a diagram showing an image forming apparatus according to an eighth embodiment of the present invention. This image forming apparatus is a tandem full-color laser printer including a light deflector according to one embodiment of the present invention. Referring to FIG. 28, a conveyor belt 1202, which is disposed horizontally to convey transfer paper (not graphically illustrated) fed from a paper feed cassette 1201, is provided in the lower part of the laser printer. A photosensitive body 1203Y for yellow (Y), a photosensitive body 1203M for magenta (M), a photosensitive body 1203C for cyan (C), and a photosensitive body 1203K for black (K) are disposed at equal intervals in order described from the upstream side on the conveyor belt 1202. In the following, the additional letters Y, M, C, and K are added appropriately to reference numerals in order to distinguish between the corresponding colors.

These photosensitive bodies 1203Y, 1203M, 1203C, and 1203K are formed to have the same diameter. Process units are disposed in order around each of the photosensitive bodies 1203Y, 1203M, 1203C, and 1203K in accordance with the process of electrophotography.

Taking the photosensitive body 1203Y as an example, a charger 1204Y as a charging part, an optical scanning device 1205Y, a development unit 1206Y, a transfer charger 1207Y as a transfer part, a cleaning unit 1208Y, etc., are disposed in this order around the photosensitive body 1203Y. This is the same with the other photosensitive bodies 1203M, 1203C, and 1203K. That is, according to this embodiment, each of the photosensitive bodies 1203Y, 1203M, 1203C, and 1203K serves as a surface to be illuminated (illumination surface) set for the corresponding color. The optical scanning devices 1205Y, 1205M, 1205C, and 1205K are provided for the photosensitive bodies 1203Y, 1203M, 1203C, and 1203K, respectively, with a one-to-one correspondence. The optical scanning devices 1205Y, 1205M, 1205C, and 1205K are integrated into an optical scanning device 1231.

Further, registration rollers 1209 and a belt charger 1210 are provided around the conveyor belt 1202 so as to be positioned on the upstream side of the photosensitive body 1203Y. Further, a belt separation charger 1211, a discharging charger 1212, a cleaning unit 1213, etc., are provided in order around the conveyor belt 1202 so as to be positioned on the downstream side of the photosensitive body 1203K. A fusing unit 1214, paper output rollers 1216, and a paper output tray 1215 are provided in order on the downstream side of the belt separation charger 1211 in the transfer paper conveyance direction.

In this embodiment of the above-described configuration, for example, at the time of a full-color (multicolor) mode, after being rotated by a rotation driver part and evenly charged with the charger 1204Y, the photosensitive body 1203Y is scanned by a light beam generated based on a Y image signal through the optical scanning device 1205Y so that an electrostatic latent image is formed on the photosensitive body 1203Y. This electrostatic latent image is developed by the development unit 1206Y so as to be made visible as a Y toner image. The Y toner image is transferred onto transfer paper by the transfer charger 1207Y. The transfer paper is conveyed, being electrostatically attracted and adhered to the conveyor belt 1202. After the transfer, residual toner is removed from the photosensitive body 1203Y by the cleaning unit 1208Y, and the photosensitive body 1203Y prepares for the next image formation.

Likewise, after being evenly charged with the corresponding chargers, the photosensitive bodies 1203M, 1203C, and 1203K are scanned by corresponding light beams generated based on M, C, and K image signals, respectively, through the corresponding optical scanning devices 1205M, 1205C, and 1205K, so that corresponding electrostatic latent images are formed on the photosensitive bodies 1205M, 1205C, and 1205K. These electrostatic latent images are developed by the corresponding development units so as to be made visible as an M toner image, a C toner image, and a K toner image, respectively. These M, C, and K toner images are successively transferred onto the transfer paper by the transfer charger 1207Y so as to be superposed on the Y toner image, the transfer paper being conveyed, electrostatically attracted and adhered to the conveyor belt 1202. As a result, a four-color composite toner image (full-color image) is formed. After the transfer, residual toner is removed from each of the photosensitive bodies 1203M, 1203C, and 1203K by the corresponding cleaning unit, and each of the photosensitive bodies 1203M, 1203C, and 1203K prepares for the next image formation.

On the other hand, the transfer paper is fed from the paper feed cassette 1201. The fed transfer paper is conveyed to the registration rollers 1209, and is stopped temporarily at the registration rollers 1209. The registration rollers 1209 feeds the transfer paper in time with the Y toner image on the photosensitive body 1203Y. This transfer paper from the registration rollers 1209 is charged by the belt charger 1210 to be electrostatically attracted and adhered to the conveyor belt 1202. While the transfer belt is being conveyed by the conveyor belt 1202, the respective color images of the photosensitive bodies 1203Y, 1203M, 1203C, and 1203K are successively transferred to and superposed one over another on the transfer paper. As a result, a full-color image is formed.

The transfer paper on which the full-color image is formed is discharged by the belt separation charger 1211 to be separated from the conveyor belt 1202. Thereafter, the full-color image is fixed on the transfer paper by the fusing unit 1214, and the transfer paper is output onto the paper output tray 1215 by the paper output rollers 1216. After the separation of the transfer paper, the conveyor belt 1202 is discharged by the discharging charger 1212 and cleaned by the cleaning unit 1213.

At the time of a black-color mode (monochrome mode), the photosensitive bodies 1203Y, 1203M, and 1203C and the process units related thereto are made inactive, and only on the photosensitive body 1203K is rotated by a rotation driver part and charged evenly by the corresponding charger 1204K. Then, the photosensitive body 1203K is scanned with a light beam generated based on a K image signal through the optical scanning device 1205K so that an electrostatic latent image is formed on the photosensitive body 1203K. This electrostatic latent image is developed by the corresponding development unit and transferred onto transfer paper on the conveyor belt 1202 by the corresponding transfer-charger. The toner image transferred onto the transfer paper is fixed onto the transfer paper as a monochrome image by the fusing unit 1214. The transfer paper on which the monochrome image is fixed is output onto the paper output tray 1215 by the paper output rollers 1216.

The optical scanning device 1231 (the optical scanning devices 1205y, 1205M, 1205C, and 1205K) shares the polygon mirror 1001 of the fifth embodiment as a polygon mirror 1300. The same optical scanning device as that of the sixth embodiment is employed as each of the optical scanning devices 1205y, 1205M, 1205C, and 1205K. In this case, in the optical scanning devices 1205M and 1205Y, light beams from corresponding light sources travel through corresponding coupling lenses, apertures, and cylindrical lenses to be made incident on the reflection surfaces 1008a and 1008b, respectively, of the polygon mirror 1300 (1001) from the right side in FIG. 28. Then, the light beams are reflected therefrom to illuminate the photosensitive bodies 1203M and 1203Y, respectively, through corresponding lenses and mirrors. Further, in the optical scanning devices 1205C and 1205K, light beams from corresponding light sources travel through corresponding coupling lenses, apertures, and cylindrical lenses to be made incident on the reflection surfaces 1008a and 1008b, respectively, of the polygon mirror 1300 (1001) from the left side in FIG. 28. Then, the light beams are reflected therefrom to illuminate the photosensitive bodies 1203C and 1203K, respectively, through corresponding lenses and mirrors.

Thus, the light deflector 1300 according to this embodiment may be applied to a tandem full-color laser printer. According to a tandem full-color laser printer to which the light deflector 1300 according to this embodiment is applied, a change in the temperature of optical components such as a lens due to the heat generation of the polygon mirror (light deflector) 1300, shared by the optical scanning devices 1205Y, 1205M, 1205C, and 1205K and having two tiers of mirrors (reflection surfaces 1008a and 1008b) formed in the axial directions, is reduced. As a result, a scanning beam is constant in shape, thus making it possible to perform stable optical scanning.

Thus, according to one embodiment of the present invention, it is possible to provide a DC brushless motor where the number of magnetic poles and the number of coils of the motor are six and nine, respectively, in which it is possible to reduce the windage of a motor part by reducing the diameter (A of FIG. 20) of a circumscribed circle formed by the nine salient poles of a stator core, it is possible to dispose a bearing in the center hole part of the stator core although the stator core is reduced in size, and it is possible to provide the stator core with such a shape as to prevent loss (copper loss) due to the winding resistance of a coil from increasing, so that it is possible to improve motor efficiency at high-speed rotation and thus to reduce power consumption.

According to one embodiment of the present invention, it is possible to reduce power consumption by optimizing the width (C of FIG. 20) of each part of the stator core around which the corresponding coil is wound.

According to one embodiment of the present invention, it is possible to reduce power consumption by optimizing the width (D of FIG. 20) of the part of the stator core which part connects the adjacent salient poles of the stator core.

According to one embodiment of the present invention, it is possible to reduce power consumption by optimizing the width (E of FIG. 20) of a magnetic gap part formed between each adjacent two of the salient poles of the stator core.

According to one embodiment of the present invention, it is possible to provide a DC brushless motor capable of reducing power consumption by optimizing the width (C of FIG. 20) of each part of the stator core around which the corresponding coil is wound, the width (D of FIG. 20) of the part of the stator core which part connects the adjacent salient poles of the stator core, and the width (E of FIG. 20) of a magnetic gap part formed between each adjacent two of the salient poles of the stator core.

It is possible to provide a light deflector capable of reducing power consumption by using a DC brushless motor according to one embodiment of the present invention.

According to one embodiment of the present invention, it is possible to provide a stable optical scanning device in which the power consumption and heat generation of a light deflector are reduced so that a scanning beam is constant in shape.

According to one embodiment of the present invention, it is possible to provide an image forming apparatus in which a scanning beam of an optical scanning device is constant and stable so as to achieve lower power consumption and high image quality.

The present invention is not limited to the specifically disclosed embodiments, and variations and modifications may be made without departing from the scope of the present invention.

The present application is based on Japanese Priority Patent Applications No. 2005-078750, filed on Mar. 18, 2005, and No. 2005-326952, filed on Nov. 11, 2005, the entire contents of which are hereby incorporated by reference.

What is claimed is:

1. A light deflector, comprising:
    a bearing;
    a DC brushless motor configured to operate at or above 20,000 rpm;
    a rotary body supported by the bearing and rotated by the DC brushless motor; and
    a polygon mirror fixed to the rotary body,
    wherein the DC brushless motor includes:
        an annular permanent magnet circumferentially magnetized with exactly six poles and fixed to the rotary body;
        a rotational position detector part configured to detect a rotational position of the permanent magnet; and
        a stator assembly including a stator core and nine teeth, each tooth having a separate winding coil for generating a magnetic field in the respective tooth,
    wherein the separate winding coils are connected in series in groups of three coils, each group corresponding to a phase.

2. The light deflector as claimed in claim 1, wherein the permanent magnet is disposed on an exterior side of the stator assembly.

3. The light deflector as claimed in claim 2, wherein an exterior surface of the permanent magnet is held by a non-magnetic material.

4. The light deflector as claimed in claim 3, further comprising:
    a yoke formed of a ferromagnetic body, the yoke being disposed outside the permanent magnet.

5. The light deflector as claimed in claim 3, wherein the rotational position detector part is disposed on an exterior side of the permanent magnet.

6. The light deflector as claimed in claim 1, wherein the polygon mirror has six surfaces.

7. The light deflector as claimed in claim 6, wherein the permanent magnet is fixed to the rotary body so that magnetization boundaries of the permanent magnet and apex positions of the polygon mirror substantially match each other in a rotational direction of the rotary body.

8. The light deflector as claimed in claim 1, wherein an outside diameter of the permanent magnet is smaller than an inscribed circle diameter of the polygon mirror.

9. The light deflector as claimed in claim 1, wherein the polygon mirror comprises multiple tiers of polygon mirrors formed in an axial direction.

10. An optical scanning device, comprising:
    a semiconductor laser; and
    an optical system including the light deflector as set forth in claim 1,
    wherein a beam emitted from the semiconductor laser is guided through the optical system onto a scanning surface to be scanned so as to be focused into a light spot thereon, the beam being deflected by the light deflector so as to scan the scanning surface with a scanning line.

11. An optical scanning device, comprising:
    a semiconductor laser; and
    an optical system including the light deflector as set forth in claim 1,
    wherein a plurality of beams emitted from the semiconductor laser are guided through the optical system onto a scanning surface to be scanned so as to be focused into corresponding light spots thereon, the beams being deflected by the light deflector so as to adjacently scan the scanning surface with a plurality of scanning lines.

12. An image forming apparatus, comprising:
    an optical scanning device including a semiconductor laser and an optical system including the light deflector as set forth in claim 1; and
    a photosensitive medium having a photosensitive surface,
    wherein a beam emitted from the semiconductor laser is guided through the optical system onto the photosensitive surface so as to be focused into a light spot thereon, the beam being deflected by the light deflector so as to scan the photosensitive surface with a scanning line, thereby forming a latent image on the photosensitive surface; and
    the latent image is made visible so that an image is obtained.

13. An image forming apparatus, comprising:
    an optical scanning device including a semiconductor laser and an optical system including the light deflector as set forth in claim 1; and
    a photosensitive medium having a photosensitive surface,
    wherein a plurality of beams emitted from the semiconductor laser are guided through the optical system onto the photosensitive surface so as to be focused into corresponding light spots thereon, the beams being deflected by the light deflector so as to adjacently scan the photosensitive surface with a plurality of scanning lines, thereby forming a latent image on the photosensitive surface; and
    the latent image is made visible so that an image is obtained.

14. The light deflector according to claim 1, wherein the groups of the three coils are configured in a y-connection.

15. A DC brushless motor configured to operate at or above 20,000 rpm, comprising:
    an annular permanent magnet circumferentially magnetized with exactly six poles and fixed to a rotary body;
    a rotational position detector part configured to detect a rotational position of the permanent magnet; and a stator assembly including a stator core having a center hole for fixation formed therein and nine teeth, each tooth having a separate winding coil for generating a magnetic field in the respective tooth, the stator assembly being disposed inside the annular permanent magnet with a predetermined magnetic gap formed between the stator assembly and the annular permanent magnet, wherein a diameter of the center hole falls within a range of 35±10% of a maximal diameter of the stator core, formed by a circumscribed circle at outer surfaces of the nine teeth, the outer surfaces facing the rotary body, and wherein the separate winding coils are connected in series in groups of three coils, each group corresponding to a phase.

16. The DC brushless motor as claimed in claim 15, wherein a width of each of parts of the stator core around which parts the corresponding coils are wound in a cross section of the stator core perpendicular to a rotation center axis falls within a range of 4-8% of the diameter of the circumscribed circle.

17. The DC brushless motor as claimed in claim 15, wherein a width of a part of the stator core which part connects the adjacent teeth in a cross section of the stator core perpendicular to a rotation center axis falls within a range of 4-12% of the diameter of the circumscribed circle.

18. The DC brushless motor as claimed in claim 15, wherein a width of a magnetic gap part formed between each adjacent two of the teeth in a cross section of the stator core perpendicular to a rotation center axis falls within a range of 2-8% of the diameter of the circumscribed circle.

19. The DC brushless motor as claimed in claim 15, wherein:
a width of each of parts of the stator core around which parts the corresponding coils are wound in a cross section of the stator core perpendicular to a rotation center axis falls within a range of 4-8% of the diameter of the circumscribed circle;
a width of a part of the stator core which part connects the adjacent teeth in the cross section of the stator core perpendicular to the rotation center axis falls within a range of 4-12% of the diameter of the circumscribed circle; and
a width of a magnetic gap part formed between each adjacent two of the teeth in the cross section of the stator core perpendicular to the rotation center axis falls within a range of 2-8% of the diameter of the circumscribed circle.

20. An optical scanning device, comprising:
a light source; and
an optical system including a light deflector, the light deflector including:
a bearing;
the DC brushless motor as set forth in claim 15;
a rotary body supported by the bearing and rotated by the DC brushless motor; and
a polygon mirror fixed to the rotary body,
wherein a plurality of light beams emitted from the light source are guided through the optical system onto a scanning surface to be scanned so as to be focused into corresponding light spots thereon, the light beams being deflected by the light deflector so that the light spots scan the scanning surface, the light spots being spaced at predetermined intervals.

21. An image forming apparatus, comprising:
an optical scanning device including a light source and an optical system including a light deflector, the light deflector including a bearing, the DC brushless motor as set forth in claim 15, a rotary body supported by the bearing and rotated by the DC brushless motor, and a polygon mirror fixed to the rotary body; and
a photosensitive medium having a photosensitive surface,
wherein a light beam emitted from the light source is guided through the optical system onto the photosensitive surface so as to be focused into a light spot thereon, the light beam being deflected by the light deflector so that the light spot scans the photosensitive surface, thereby forming a latent image on the photosensitive surface; and
the latent image is made visible so that an image is obtained.

22. An image forming apparatus, comprising:
an optical scanning device including a light source and an optical system including a light deflector, the light deflector including a bearing, the DC brushless motor as set forth in claim 15, a rotary body supported by the bearing and rotated by the DC brushless motor, and a polygon mirror fixed to the rotary body; and
a photosensitive medium having a photosensitive surface,
wherein a plurality of light beams emitted from the light source are guided through the optical system onto the photosensitive surface so as to be focused into corresponding light spots thereon, the light beams being deflected by the light deflector so that the light spots scan the scanning surface, the light spots being spaced at predetermined intervals, thereby forming a latent image on the photosensitive surface; and
the latent image is made visible so that an image is obtained.

23. The DC brushless motor according to claim 15, wherein the groups of the three coils are configured in a y-connection.

24. A light deflector, comprising:
a bearing;
a DC brushless motor configured to operate at or above 20,000 rpm, comprising,
an annular permanent magnet circumferentially magnetized with exactly six poles and fixed to a rotary body,
a rotational position detector part configured to detect a rotational position of the permanent magnet, and
a stator assembly including a stator core having a center hole for fixation formed therein, and nine teeth, each tooth having a separate winding coil for generating a magnetic field in the respective tooth, the stator assembly being disposed inside the annular permanent magnet with a predetermined magnetic gap formed between the stator assembly and the annular permanent magnet, a diameter of the center hole falls within a range of 35±10% of a maximal diameter of the stator core, formed by a circumscribed circle at outer surfaces of the nine teeth, the outer surfaces facing the rotary body;
a rotary body supported by the bearing and rotated by the DC brushless motor; and
a polygon mirror fixed to the rotary body,
wherein the separate winding coils are connected in series in groups of three coils, each group corresponding to a phase.

25. The light reflector according to claim 24, wherein the groups of the three coils are configured in a y-connection.

26. An optical scanning device, comprising:
a light source; and
an optical system including a light deflector, the light deflector including:
a bearing;

the DC brushless motor configured to operate at or above 20,000 rpm, comprising, an annular permanent magnet circumferentially magnetized with exactly six poles and fixed to a rotary body, a rotational position detector part configured to detect a rotational position of the permanent magnet, and a stator assembly including a stator core having a center hole for fixation formed therein, and nine teeth, each tooth having a separate winding coil for generating a magnetic field in the respective tooth, the stator assembly being disposed inside the annular permanent magnet with a predetermined magnetic gap formed between the stator assembly and the annular permanent magnet, a diameter of the center hole falls within a range of 35±10% of a maximal diameter of the stator core, formed by a circumscribed circle at outer surfaces of the nine teeth, the outer surfaces facing the rotary body;

a rotary body supported by the bearing and rotated by the DC brushless motor; and a polygon mirror fixed to the rotary body, wherein a light beam emitted from the light source is guided through the optical system onto a scanning surface to be scanned so as to be focused into a light spot thereon, the light beam being deflected by the light deflector so that the light spot scans the scanning surface, and wherein the separate winding coils are connected in series in groups of three coils, each group corresponding to a phase.

27. The optical scanning device according to claim 26, wherein the groups of three coils are configured in a y-connection.

* * * * *